US010624077B2

United States Patent
Agiwal et al.

(10) Patent No.: US 10,624,077 B2
(45) Date of Patent: Apr. 14, 2020

(54) SYSTEM AND METHOD OF SCHEDULING AND POWER SAVING IN BEAM-FORMED SYSTEM

(71) Applicant: Samsung Electronics Co., Ltd., Suwon-si, Gyeonggi-do (KR)

(72) Inventors: Anil Agiwal, Suwon-si (KR); Byounghoon Jung, Suwon-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/463,372

(22) Filed: Mar. 20, 2017

(65) Prior Publication Data

US 2017/0273058 A1 Sep. 21, 2017

Related U.S. Application Data

(60) Provisional application No. 62/311,032, filed on Mar. 21, 2016.

(51) Int. Cl.
*H04W 72/04* (2009.01)
*H04W 72/12* (2009.01)
(Continued)

(52) U.S. Cl.
CPC ........ *H04W 72/042* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS

| 8,848,673 | B2 | 9/2014 | Dinan |
| 2012/0275415 | A1 | 11/2012 | Wang et al. |

(Continued)

FOREIGN PATENT DOCUMENTS

| KR | 10-2014-0035255 A | 3/2014 |
| WO | 2015/157565 A1 | 10/2015 |

*Primary Examiner* — Chirag G Shah
*Assistant Examiner* — Amarnauth G Persaud
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a base station in a wireless communication system is provided. The method includes determining downlink (DL) transmission (TX) beam scheduling for transmitting downlink control information to a user equipment (UE), transmitting beam scheduling information to the UE, and transmitting the downlink control information according to the DL TX beam scheduling to the UE.

12 Claims, 30 Drawing Sheets

(51) Int. Cl.
*H04B 7/06* (2006.01)
*H04W 16/28* (2009.01)
*H04W 52/02* (2009.01)

(52) U.S. Cl.
CPC ....... *H04W 16/28* (2013.01); *H04W 52/0209* (2013.01); *H04W 72/1289* (2013.01); *H04W 72/046* (2013.01); *Y02D 70/1262* (2018.01); *Y02D 70/21* (2018.01); *Y02D 70/24* (2018.01); *Y02D 70/444* (2018.01)

(56) References Cited

U.S. PATENT DOCUMENTS

| | | | |
|---|---|---|---|
| 2013/0072243 A1 | 3/2013 | Yu et al. | |
| 2014/0073337 A1 | 3/2014 | Hong et al. | |
| 2014/0177561 A1* | 6/2014 | Yu | H04W 72/042 370/329 |
| 2015/0270931 A1* | 9/2015 | Sun | H04L 1/0072 370/329 |
| 2015/0358064 A1* | 12/2015 | Benjebbour | H04B 7/0452 370/329 |
| 2015/0358134 A1* | 12/2015 | Hammarwall | H04L 1/001 370/330 |
| 2016/0242159 A1* | 8/2016 | Ho | H04B 7/0408 |
| 2017/0034812 A1* | 2/2017 | Deng | H04W 72/046 |
| 2018/0049055 A1* | 2/2018 | Wiberg | H04B 7/0695 |
| 2018/0294859 A1* | 10/2018 | Niu | H04J 11/00 |

* cited by examiner

| 1st Beam Index | 2nd Beam Index | ... | Nth Beam Index |
|---|---|---|---|

: each index indicates following subframe's beam ID

[410]

| N [length] | 1st Beam Index | 2nd Beam Index | ... | Nth Beam Index |
|---|---|---|---|---|

: length of the broadcast message is included at the first

[420]

| Subframe# | 1st Beam Index | Subframe# | 2nd Beam Index | ... |
|---|---|---|---|---|

: indicates each subframe #, following beam index

[430]

| Subframe# | 1st Beam Index | Subframe# | 2nd Beam Index | 2nd Beam Index 2 | ... |
|---|---|---|---|---|---|

: indicates each subframe #, following beam index(s)

SYSTEM AND METHOD OF SCHEDULING AND POWER SAVING IN BEAM-FORMED SYSTEM

CROSS-REFERENCE TO RELATED APPLICATION(S)

This application claims the benefit under 35 U.S.C. § 119(e) of a U.S. Provisional application filed on Mar. 21, 2016 in the U.S. Patent and Trademark Office and assigned Ser. No. 62/311,032, the entire disclosure of which is hereby incorporated by reference.

TECHNICAL FIELD

The present disclosure relates to a method and apparatus of scheduling and power saving in a beamformed system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a beamformed system, a base station transmits scheduling control information using beamforming. The base station cannot transmit using all transmission beams in all subframes. So monitoring all the subframes by a user equipment (UE) is unnecessary and leads to power consumption at UE. Therefore, an enhanced method of scheduling and power saving is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for scheduling and power saving in a beamformed system.

In accordance with an aspect of the present disclosure, a method of a base station in a wireless communication system is provided. The method includes determining downlink (DL) transmission (TX) beam scheduling for transmitting downlink control information to a user equipment (UE), transmitting beam scheduling information to the UE, and transmitting the downlink control information according to the DL TX beam scheduling to the UE.

In accordance with another aspect of the present disclosure, a method of a user equipment (UE) in a wireless communication system is provided. The method includes receiving beam scheduling information for receiving downlink control information from a base station, determining at least one scheduling period to be monitored based on the beam scheduling information, and monitoring the downlink control information in at least one scheduling period.

In accordance with another aspect of the present disclosure, a base station in a wireless communication system is provided. The base station includes a transceiver configured to transmit and receive signals to and from a user equipment (UE), and at least one processor configured to control to determine downlink (DL) transmission (TX) beam scheduling for receiving downlink control information to the UE, transmit beam scheduling information to the UE, and transmit the downlink control information according to the DL TX beam scheduling to the UE.

In accordance with another aspect of the present disclosure, a user equipment (UE) in a wireless communication system is provided. The UE includes a transceiver configured to transmit and receive signals to and from a base station, and at least one processor configured to control to receive beam scheduling information for transmitting downlink control information from a base station, determine at least one scheduling period to be monitored based on the beam scheduling information, and monitor the downlink control information in at least one scheduling period.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating structures of the broadcast message according to an embodiment of the present disclosure;

Throughout the drawings, it should be noted that like reference numbers are used to depict the same or similar elements, features, and structures.

DETAILED DESCRIPTION

Figure 1:
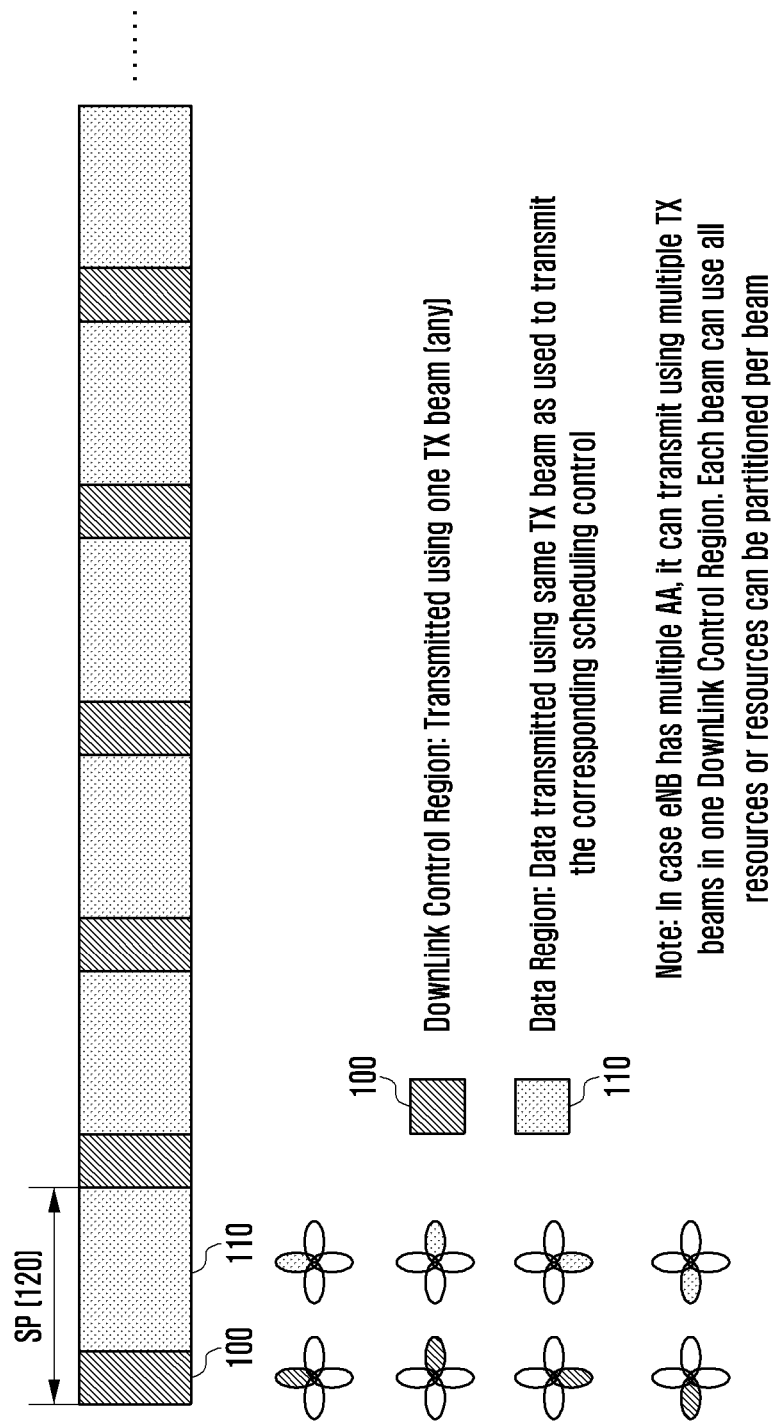
FIG. 1 is a diagram illustrating a method of performing scheduling in a scheduling period (SP) wherein SP comprises of a downlink control region and data region according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to various embodiments of the present disclosure, means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

A method of providing a generally high data transmission rate includes a method of providing communication using a wider frequency band and a method of increasing frequency usage efficiency. However, it is very difficult to provide a higher average data rate through the latter method. This is because communication technologies of a current generation provide frequency usage efficiency close to a theoretical limit and thus, it is very difficult to increase the frequency usage efficiency up to that or more through a technical improvement. Accordingly, it can be said that a feasible method for increasing the data transmission rate is a method of providing data services through the wider frequency band. At this time, the thing to consider is an available frequency band. In view of the current frequency distribution policy, a band in which a broadband communication of 1 GHz or more is possible is limited and a practically selectable frequency band is only the millimeter wave band of 28 GHz or more. The signal transmitted on the high frequency band suffers from huge path losses and propagation losses compared to a signal transmitted on a frequency band of 2 GHz or lower used by the conventional cellular systems. This significantly reduces the coverage of a base station using the same power as the conventional cellular systems.

Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as RX beam.

Typically, in a wireless communication network user equipment (UE) can be in one of radio resource control (RRC) idle state or RRC connected state. A UE in RRC Idle performs cell selection and reselection—in other words, it decides on which cell to camp. The RRC idle UE monitors a paging channel to detect incoming calls, and also acquires system information (SI). The SI mainly consists of parameter by which network can control the cell (re)selection process. In RRC connected state, network allocates radio resources to the UE to facilitate the transfer of (unicast) data via shared data channels. To support this operation, the UE monitors an associated control channel used to indicate the dynamic allocation of the shared transmission resources in time and frequency. The UE provide the network with reports of its buffer status and of the downlink channel quality, as well as neighbor cell measurement information to enable network to select the most appropriate cell for the UE.

In the RRC connected state UE monitors the downlink (DL) subframes or transmit time interval (TTI) for downlink control information (downlink control information can be transmitted using physical downlink control channel ((e) PDCCH)). Downlink control information can indicate whether the UE is scheduled in DL or UL. If the UE is scheduled in DL then UE decode and receive the downlink packet using the received control information. If the UE is scheduled in UL then UE uses the received control information to transmit the uplink packet.

In a beamformed system the downlink control information is transmitted by the base station (BS) using beamforming BS supports multiple TX beams and transmits using one or more TX beams in subframe or TTI or time slot. UE monitors the subframes or TTIs or time slots for receiving downlink control information (i.e., PDCCH/ePDCCH). BS (or evolved Node B (Enb) or gNB or transmission and reception point (TRP)) cannot transmit using all its TX beams in all subframes or TTIs or time slots. So UE monitoring all the subframes or TTIs or time slots is unnecessary and leads to power consumption at UE. Therefore, An enhanced method of receiving downlink control information and power saving is needed.

<One Downlink Control, One Data Region> Per Scheduling Period (SP)

FIG. 1 is a diagram illustrating a method of performing scheduling in a SP wherein SP comprises of a downlink control region and data region according to an embodiment of the present disclosure.

Referring to FIG. 1, downlink control (or downlink control information) is transmitted as illustrated in FIG. 1. In FIG. 1, it is assumed that there are four TX beams at BS (or eNB or gNB or TRP). Each SP 120 (or subframe or transmit timer interval or time slot) comprise of a downlink control region 100 and a data region 110. BS (or eNB or gNB or TRP) transmits downlink control information in downlink control region using one TX beam. If the BS (or eNB or gNB or TRP) has multiple antenna arrays (AAs) or antenna panels, it can transmit downlink control information using multiple TX beams in one SP. The downlink control information transmitted in each TX beam can be for same UE or different UEs.

Downlink control information transmitted in 'n'th SP can indicate DL data in 'nth' SP. In this case, if downlink control information indicates DL data in data region then data in data region is transmitted by the BS (or eNB or gNB or TRP) using the same TX beam as used to transmit the downlink control information. In another embodiment, downlink control information transmitted in 'n'th SP can indicate DL data in 'n+K' SP. 'K' can be fixed or can be indicated in downlink control information. In this case, if downlink control information in SP 'n' indicates DL data in data region of another SP then data in data region can be transmitted by the BS (or eNB or gNB or TRP) using the same or different TX beam then used to transmit the downlink control information. Downlink control information transmitted in 'n'th SP can indicate UL data in in 'n+K' SP. 'K' can be fixed or can be indicated in downlink control information. In an embodiment 'K' can be based on UE capability. In an embodiment, downlink control information can also be transmitted in data region. In an embodiment, in case a BS (or eNB or gNB or TRP) has multiple AAs or antenna panels, it can transmit downlink control information using multiple TX beams in one downlink control region. Each TX beam can use all time and frequency resources in downlink control region or time and frequency resources in downlink control region can be partitioned per TX beam. In an embodiment, the downlink control region can be partitioned into one or more control resource set. The bandwidth of each control resource set can be smaller than carrier bandwidth. In case of multiple AAs or antenna panels in the BS (or eNB or gNB or TRP), each of these partition or control resource set can be mapped to one or more TX beams among multiple TX beams. In another embodiment, each of these partition or control resource set of the partitioned downlink control region can be allocated to different UEs. Instead of monitoring or receiving the downlink control information over entire carrier bandwidth, UE monitors one or more control resource sets assigned to it. The control resource sets can be assigned using dedicated signaling. This reduces the UEs power consumption. In an embodiment, UE monitors one control resource set during the off duration of DRX cycle and monitors all or additional control resource sets during the on duration of DRX cycle, if UE is configured with a DRX cycle. The control resource set(s) monitored by UE during the on duration and the control resource set(s) monitored by UE during the off duration can be signaled to UE in dedicated signaling.

TX beam(s) used for DL transmission to UE are described as below. UE sends feedback to BS (or eNB or gNB or TRP) about the best DL TX beam or N best DL TX beams. DL TX beam refers to a TX beam of BS used for transmission in DL. Best DL TX beam is the TX beam of BS which can be received by UE with best signal quality amongst all the TX beams. If N is greater than one then all DL TX beams corresponds to same RX beam of UE. If UE has multiple (P, P is the number of antenna arrays) AAs or antenna panels for RX beamforming, N best DL TX beams reported may correspond to one or multiple (P) RX beams. DL RX beam refers to a RX beam of UE used for receiving the DL transmission. The DL RX beam with which the UE receives the DL transmission with best signal quality is the best DL RX beam. The feedback can be sent periodically by UE or as and when TX beam is changed. BS (or eNB or gNB or TRP) transmits to a UE in SP using the DL TX beam reported in latest beam feedback received at least time 'T' before the SP. 'T' can be fixed or signaled to UE in in dedicated or broadcast signaling.

Figure 2A:
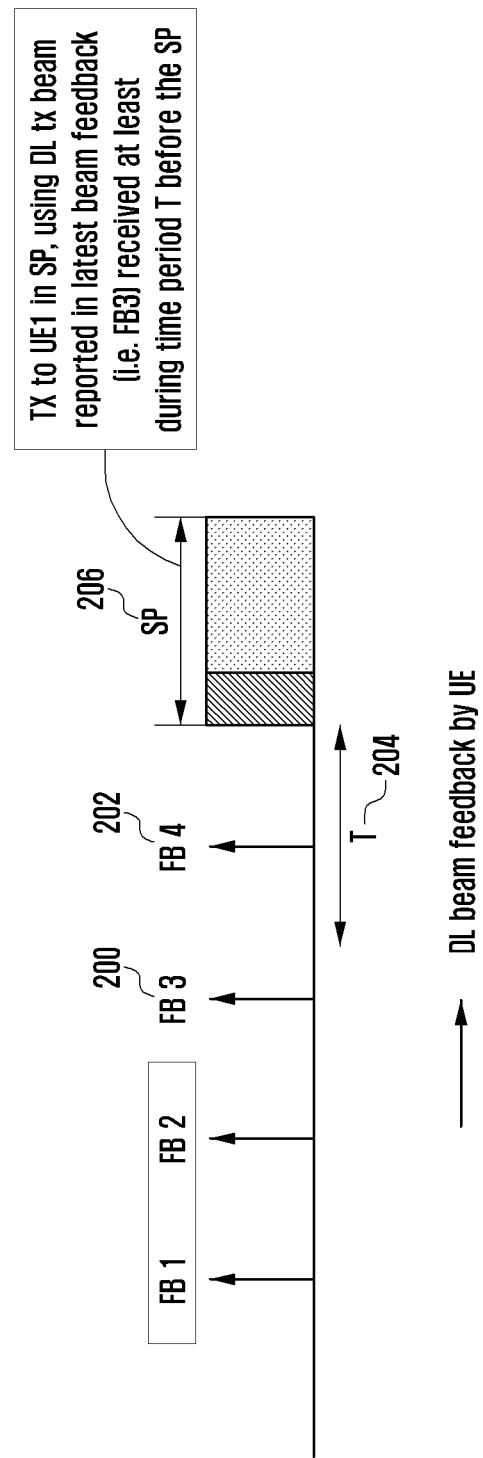
FIGS. 2A, 2B and 2C are diagrams illustrating beam feedback by user equipment (UE) according to various embodiments of the present disclosure.
Figure 2B:
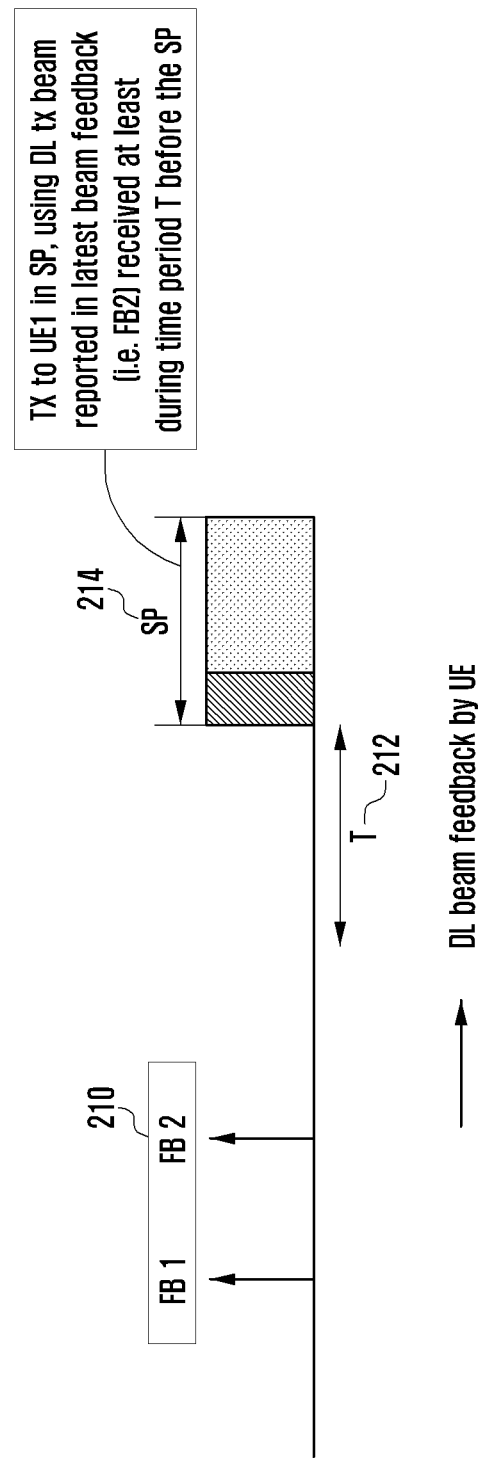
Figure 2C:
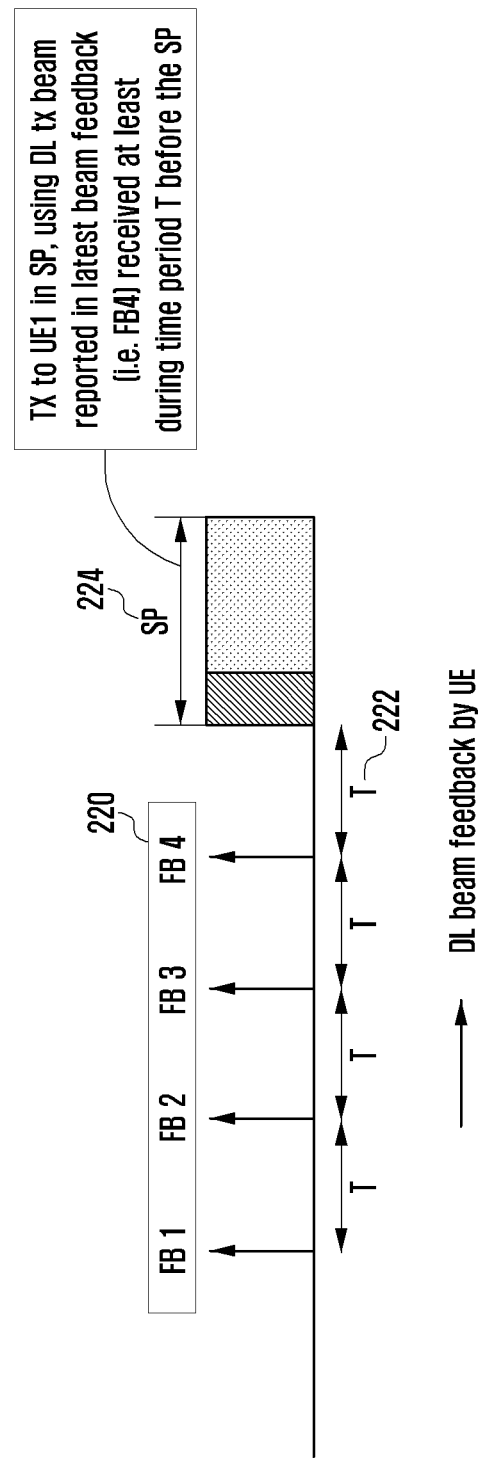

FIGS. 2A, 2B and 2C are diagrams illustrating beam feedback by UE according to various embodiments of the present disclosure.

Referring to FIG. 2A, BS used DL TX beam indicated in beam feedback FB3 200 for transmitting in SP which is not the latest beam feedback. FB4 202 is latest but time interval between this feedback and SP 206 is less than T 204.

Referring to FIG. 2B, BS used DL TX beam indicated in beam feedback FB2 210 for transmitting in SP 214, since FB2 210 is the latest beam feedback before T 212.

Referring to FIG. 2C, beam feedback period is configured such that time period between beam feedback and SP is T 222. BS use the latest beam feedback in this case i.e., DL TX beam indicated in beam feedback FB4 220 for transmitting in SP 224.

UE may use the best RX beam corresponding to DL TX beam reported in latest beam feedback transmitted at least during period of time T before the SP. Alternately, if the beam feedback is configured such that time interval between beam feedback and SP is at least T then UE may use the best RX beam corresponding to DL TX beam reported in latest beam feedback transmitted before the SP. Alternately, UE may use the best RX beam corresponding to DL TX beam reported in latest beam feedback transmitted before the SP.

UE Operation without power saving is described as below. UE monitors downlink control in each SP (e.g., subframe or TTI) using the best DL RX beam. If UE has multiple (P) AAs or antenna panels for RX beamforming, then UE may receive downlink control using one or more (up to P) DL RX beams. If resources in downlink control region are partitioned per DL TX beam then it monitors resources corresponding to DL best TX beam. If downlink control corresponding to its identification (ID) is decoded in a SP then, if downlink control corresponds to DL data then UE decode data in data region according to downlink control info. RX beam used to receive the downlink control is used to receive data. If downlink control corresponds to UL then UE transmit in data region according to downlink control info.

<Power Saving Method 1>

Figure 3A:
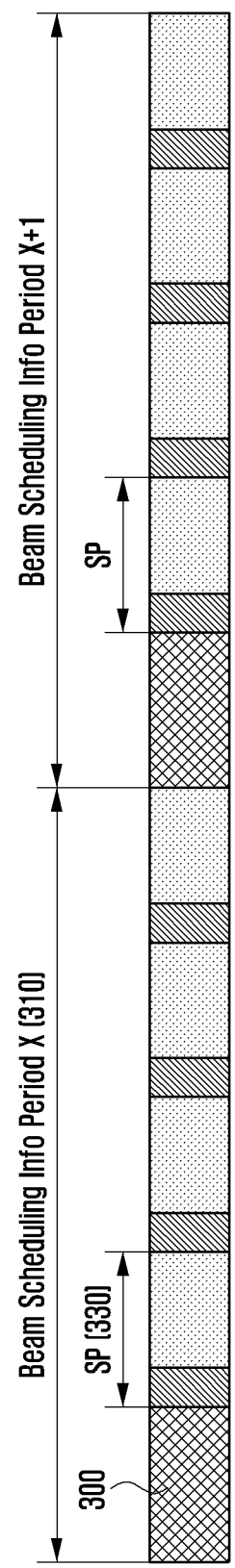
FIG. 3A is a diagram illustrating power saving method 1 according to an embodiment of the present disclosure.

FIG. 3A is a diagram illustrating power saving method 1 according to an embodiment of the present disclosure.

Referring to FIG. 3A, BS (or eNB or gNB or TRP) broadcasts periodically beam scheduling info 300. In an embodiment of method 1 beam scheduling info includes information about the BS's (or eNB's or gNB's or TRP's) DL TX beams which will be used for transmission in each SP 330 (e.g., subframe or TTI or time slot) of beam scheduling info period 310. BS (or eNB or gNB or TRP) can indicate which TX beam(s) are used for transmission in which SP (or subframe or TTI or slot). Beam scheduling info transmitted in beam scheduling info period 'X' may indicate beam scheduling info for SPs in beam scheduling info period 'X' or it may indicate beam scheduling info for SPs in beam scheduling info period 'X+n' where 'n' is fixed or configured (signaled) by network in broadcast or dedicated signaling. Beam scheduling info can be broadcasted by BS (or eNB or gNB or TRP) using one or more TX beams. The length of beam scheduling info period can be fixed or configured (signaled) by network in broadcast or dedicated signaling. In an embodiment it can be broadcasted using all TX beams.

Figure 3B:
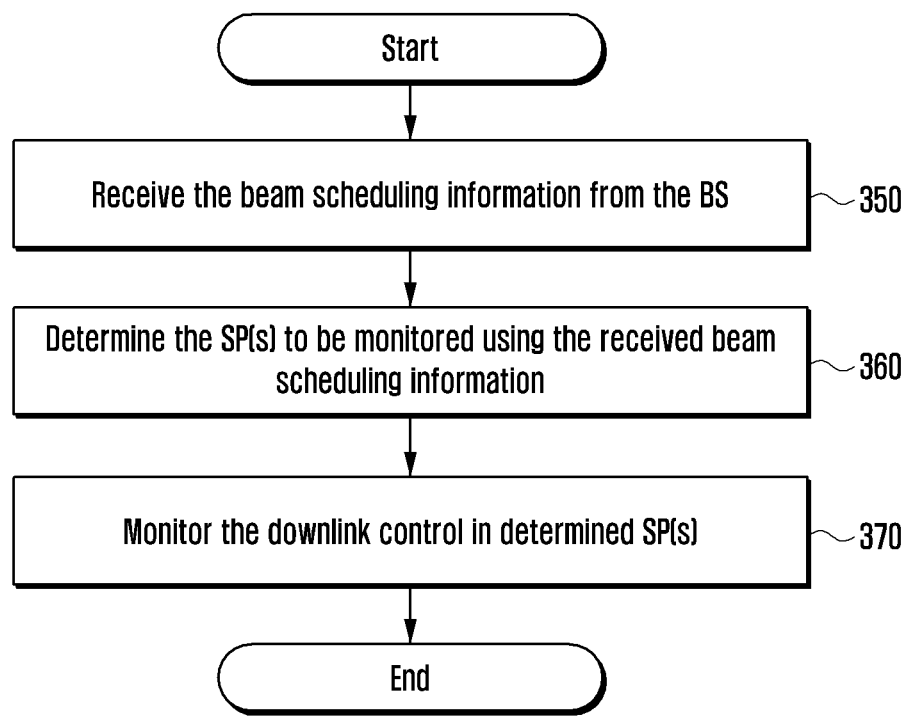
FIG. 3B is a flowchart illustrating the UE operation according to power saving method 1 according to an embodiment of the present disclosure.

FIG. 3B is a flowchart illustrating the UE operation according to power saving method 1 according to an embodiment of the present disclosure.

Referring to FIG. 3B, a UE first receives beam scheduling info from the BS (or eNB or gNB or TRP). UE may receive the beam scheduling info using its best DL RX beam in operation 350. If UE has multiple (P) AAs or antenna panels for RX beamforming, then UE may receive the beam scheduling info using one or more (up to P) DL RX beams. UE then determines the SP(s) to be monitored using the received beam scheduling info in operation 360. Beam scheduling info includes information about the BS's (or eNB's or gNB's or TRP's) DL TX beams which will be used for transmission in each SP (e.g., subframe or TTI or time slot) of beam scheduling info period. Beam scheduling info received in beam scheduling info period 'X' indicates beam scheduling info for SPs in beam scheduling info period 'X+n', where n>=0; 'n' is fixed or configured (signaled) by network in broadcast or dedicated signaling. In an embodiment, UE monitors each SP of beam scheduling Info period in which UE's best DL TX beam is used for DL transmission. If UE's best DL TX beam is not used for DL transmission in any SP of beam scheduling Info period then UE does not monitor downlink control in any SPs of beam scheduling Info period. In an embodiment, UE monitors each SP of beam scheduling Info period in which at least one of N best DL TX beams reported by UE in beam feedback is used for DL transmission. If at least one of N best DL TX beams reported by UE in beam feedback is not used for DL transmission in any SP of beam scheduling Info period then UE does not monitor downlink control in any SPs of beam scheduling Info period.

UE then monitors the downlink control in determined SP(s) in beam scheduling info period in operation 370. It does not monitor downlink control in other SP(s) of beam scheduling info period. If the number of SP(s) determined for monitoring is zero based on received beam scheduling information then UE does not monitor downlink control in any SPs of beam scheduling Info period. The UE receives downlink control info in the determined SP(s) using the best DL RX beam. If UE has multiple (P) AAs or antenna panels for RX beamforming, then UE may receive the downlink control info using one or more (up to P) DL RX beams.

If downlink control corresponding to UE's ID (e.g., cellular radio network temporary ID (C-RNTI)) is decoded in a SP then, if downlink control corresponds to DL data then the UE decodes data in data region according to downlink control info. DL RX beam used to receive the downlink control is used to receive data.

If downlink control corresponds to UL then a UE transmits in data region according to downlink control info.

If beam scheduling info does not indicate any SP then UE does not monitor downlink control in the SPs in beam scheduling Info period.

In another embodiment of method 1 beam scheduling info indicates all DL TX beams which will be used for transmission in SPs of beam scheduling info period. A BS (or eNB or gNB or TRP) does not indicate mapping between SP(s) and DL TX beam(s).

The UE operation is as follows. A UE first receives beam scheduling info from the BS (or eNB or gNB or TRP). UE may receive the beam scheduling info using its best DL RX beam. If UE has multiple (P) AAs or antenna panels for RX beamforming, then UE may receive the beam scheduling inform using one or more (up to P) DL RX beams.

UE determines whether to monitor the SPs of beam scheduling info period 'X+n' using the received beam scheduling info. Beam scheduling info includes information about the BS's (or eNB's or gNB's or TRP's) DL TX beams which will be used for transmission in SPs (e.g., subframe or TTI or time slot) of beam scheduling info period. Beam scheduling info received in beam scheduling info period 'X' indicates beam scheduling info for SPs in beam scheduling info period 'X+n', where n>=0; 'n' is fixed or configured (signaled) by network in broadcast or dedicated signaling. In an embodiment, UE monitors downlink control in the SPs of beam scheduling info period 'X+n' if the UE's best DL TX beam ID is included in received beam scheduling info. UE does not monitor downlink control in any SP of beam scheduling info period 'X+n' if the UE's best DL TX beam ID is not included in received beam scheduling info. In another embodiment, UE monitors downlink control in the SPs of beam scheduling info period 'X+n' if DL TX beam ID of at least one of N best DL TX beams reported by UE in beam feedback to BS is included in received beam scheduling info. UE does not monitors downlink control in any SP of beam scheduling info period 'X+n' if DL TX beam ID of none of N best DL TX beams reported by UE in beam feedback to BS is included in received beam scheduling info.

If UE monitors SPs of beam scheduling info period 'X+n', UE receives downlink control info using the best DL RX beam. If UE has multiple (P) AAs or antenna panels for RX beamforming, then UE may receive the downlink control info using one or more (up to P) DL RX beams.

If downlink control corresponding to UE's ID (e.g., C-RNTI) is decoded in a SP then, if downlink control corresponds to DL data then a UE decodes data in data region according to scheduling control info. DL RX beam used to receive the downlink control is used to receive data.

If downlink control corresponds to UL then the UE transmit in data region according to downlink control info.

In an embodiment beam scheduling info period can be signaled by eNB by signaling following parameters: Beam scheduling info period and offset can be signaled. Beam scheduling info period starts at short form negation (SFN) which satisfies the following Equation 1.

$$\text{SFN mod(beam scheduling info period)=Offset} \quad \text{Equation (1)}$$

Offset is the offset of start of first beam scheduling info period with respect to SFN 0.

FIG. 4 is a diagram illustrating structures of the broadcast message according to an embodiment of the present disclosure.

Referring to FIG. 4, the broadcast message in FIG. 3A can have one of following structure.

The first structure of the broadcast message is denoted by reference number 400. In the first structure, each index indicates following SP's beam ID.

The second structure of the broadcast message is denoted by reference number 410. In the second structure, the length of the broadcast message is included at the first and each SP's beam IDs are following.

The third structure of the broadcast message is denoted by reference number 420. In the third structure, each index indicates a number of a SP and beam index of the SP respectively.

The fourth structure of the broadcast message is denoted by reference number 430. In the fourth structure, each index indicates a number of a SP and beam indices of the SP respectively.

In an embodiment, for a special subframe which needs to be transmitted with multiple beams such as random access frame (RACH) or any reference signal subframe, the beam index might be predefined with a specific ID, or be an ID which is not used or out of range of beam ID, such as [0000 . . . 0] or [1111 . . . 1], or not indicated or specified at all.

In this example, we consider transmitting all the beam IDs for the subframes regardless of the downlink or uplink sub frame. However, in an embodiment, an eNB may transmit beam IDs of subframes with the category of the subframe, such as DL, UL, or a self-contained consisting of both DL and UL.

<Power Saving Method 2>

Figure 5A:
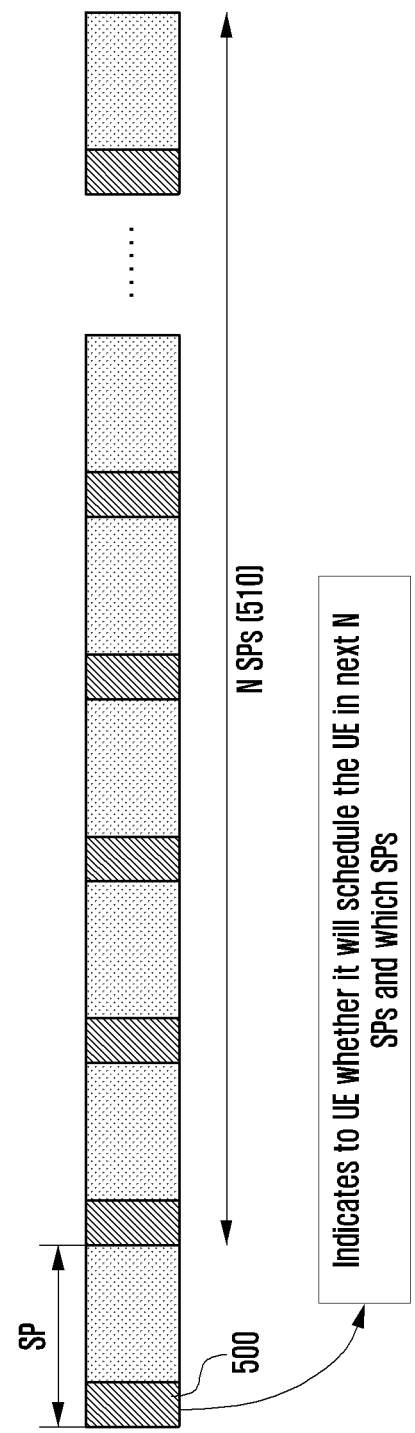
FIGS. 5A and 5B are diagrams illustrating power saving method 2 according to various embodiments of the present disclosure.
Figure 5B:
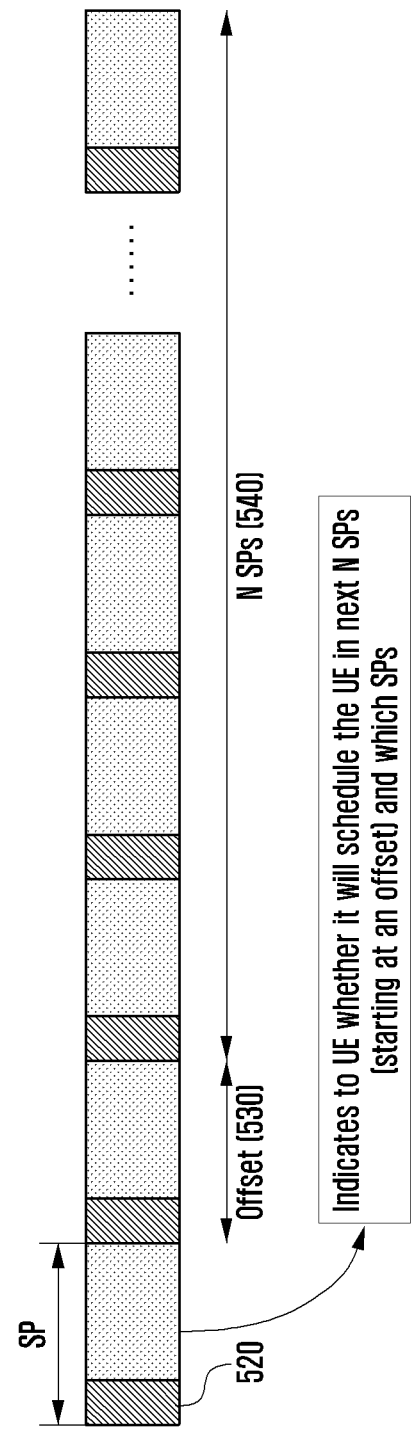

FIGS. 5A and 5B are diagrams illustrating power saving method 2 according to various embodiments of the present disclosure.

Referring to FIG. 5A, in an embodiment downlink control 500 or data or MAC CE or RRC signaling message can indicate to UE whether it will schedule the UE in next N SPs 510 and/or which SPs. The value of N can be pre-defined. Alternately N can be signaled in downlink control 500 or data or MAC CE or RRC signaling message in which BS (or eNB or gNB or TRP) indicate to UE that it will not schedule the UE in next N SPs. In power saving method 2, UE operation is same as FIG. 2, except that a BS (or eNB or gNB or TRP) may indicate in downlink control or data or MAC CE or RRC signaling message whether it will schedule (i.e., transmit PDCCH for) UE in next N SPs and/or which SPs. It may also indicate the SPs in which it can schedule UE. Based on this information UE can skip monitoring downlink control in SP(s) in which UE will not be scheduled.

Referring to FIG. 5B, in an alternate embodiment downlink control 520 or data or MAC CE or RRC signaling message can indicate to UE whether it will schedule the UE in next N SPs 540 starting at an offset 530 and/or which SPs.

<Power Saving Method 3>

In this method, each SP (subframe or TTI or time slot) is mapped to one or more DL TX beams. This mapping is signaled by eNB to UE in broadcast signaling or dedicated signaling.

Figure 6A:
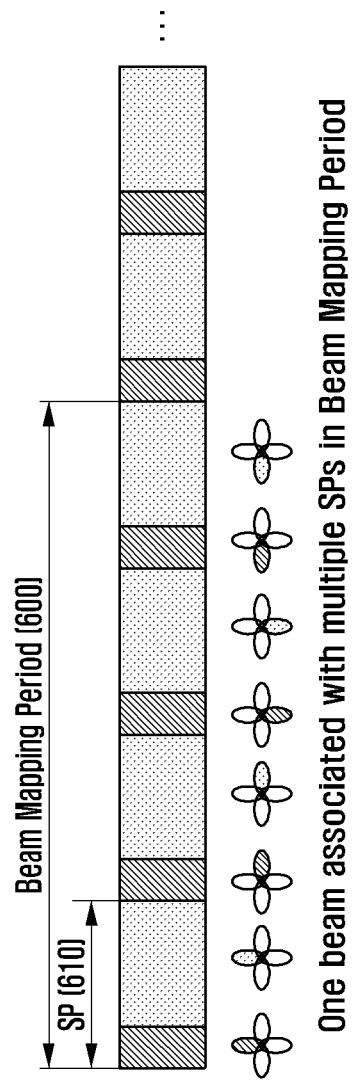
FIGS. 6A, 6B, 7A, and 7B are diagrams illustrating power saving method 3 according to various embodiments of the present disclosure.
Figure 6B:
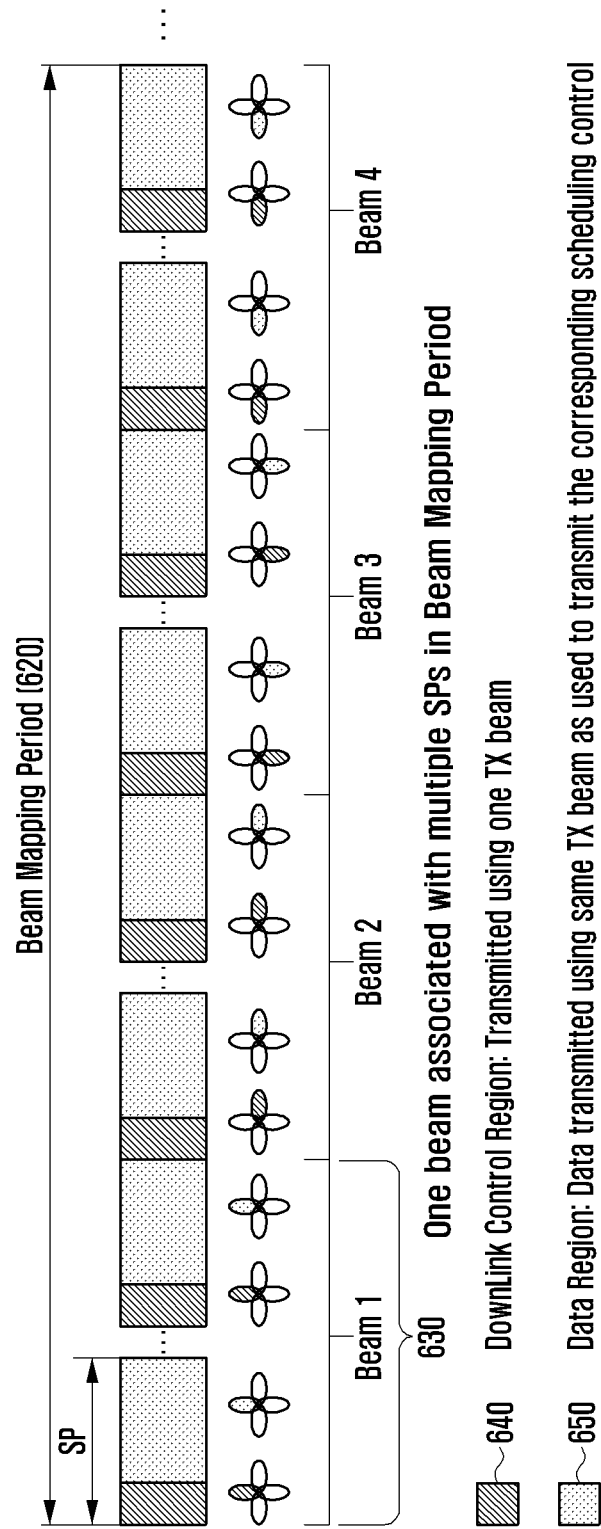
Figure 7A:
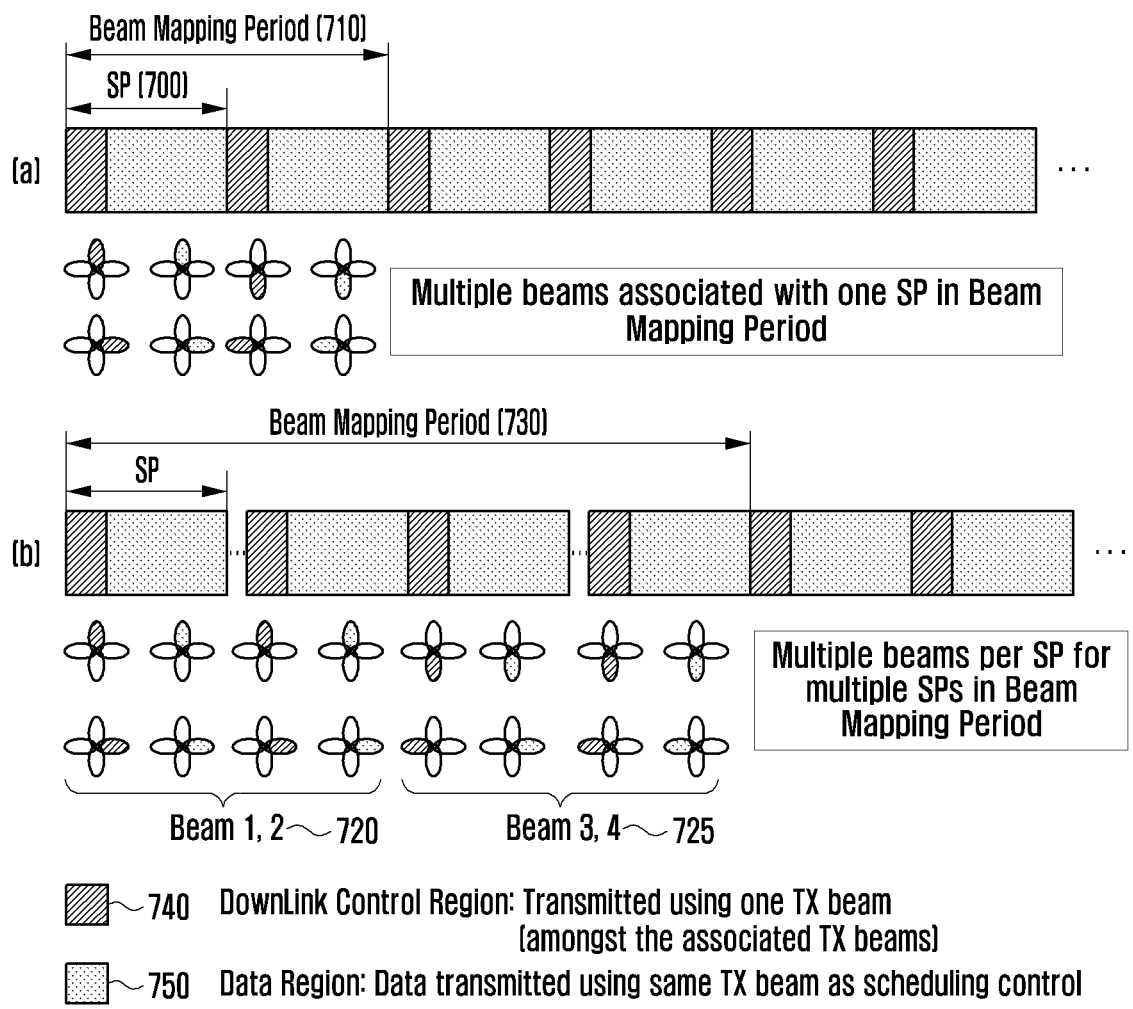

FIGS. 6A, 6B, 7A, and 7B are diagrams illustrating power saving method 3 according to various embodiments of the present disclosure. FIGS. 6A and 6B show the case wherein one DL TX beam is associated with a SP and FIG. 7A shows the case wherein multiple DL TX beam(s) is associated with a SP.

Referring to FIG. 6A, one DL TX beam is associated with one SP 610 in beam mapping period 600. Downlink control region 640 is transmitted using one DL TX beam and data transmitted in data region 650 is transmitted using same DL TX beam as used to transmit the corresponding downlink control.

Referring to FIG. 6B, one DL TX beam is associated with multiple SPs (e.g., 630) in beam mapping period 620. Also, downlink control in downlink control region 640 is transmitted using one DL TX beam and data transmitted in data region 650 is transmitted using same DL TX beam as used to transmit the corresponding downlink control.

Referring to FIG. 7A, portion (a), multiple DL TX beams are associated with one SP in beam mapping period 710. In one SP 700, there are downlink control region 740 and data region 750. Downlink control in downlink control region 740 is transmitted using one beam amongst the associated DL TX beams. Data in data region 750 is transmitted using same beam as downlink control. In case the eNB has multiple AAs or antenna panels, it can transmit using multiple DL TX beams in one downlink control region. Each DL TX beam can use all resources or resources can be partitioned per DL TX beam. Referring to FIG. 7A, portion (b), there are multiple DL TX beams per SP for multiple SP in beam mapping period 730. DL TX beams 1 and 2 are mapped to multiple SPs 720 and DL TX beams 3 and 4 are mapped to multiple SPs 725.

In an embodiment, some SPs may not be mapped to any DL TX beam or may be mapped to all DL TX beams.

Figure 7B:
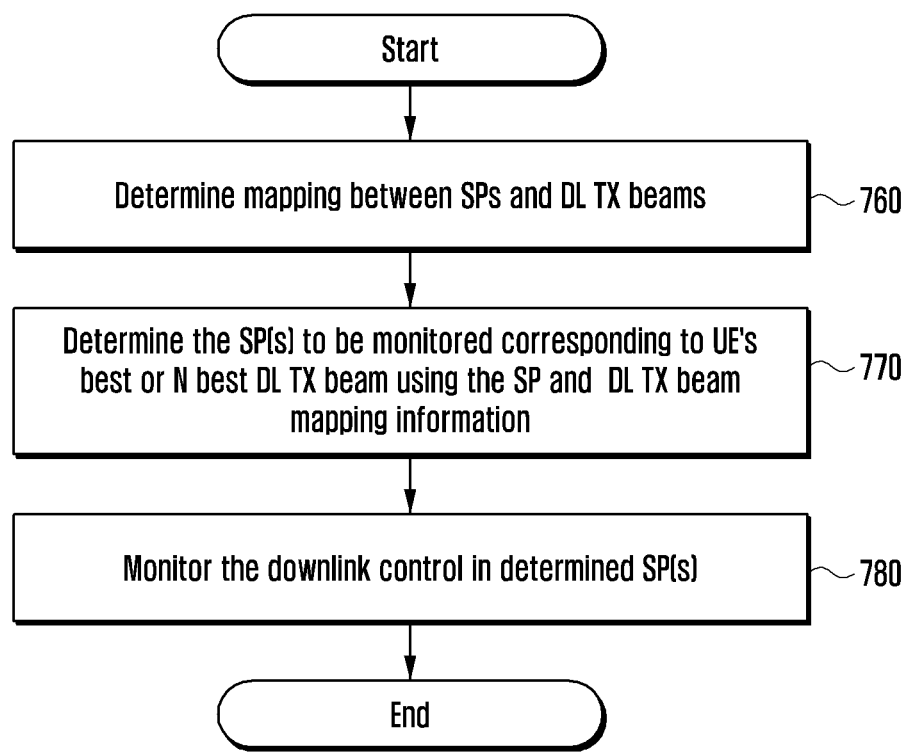

FIG. 7B is a flowchart illustrating the UE Operation according to power saving method 3 according to an embodiment of the present disclosure.

Referring to FIG. 7B, UE first determines the mapping between SPs and DL TX beams in operation 760. This can be determined by receiving the SPs and DL TX beams mapping information from the BS (or eNB's or gNB's or TRP's). In an embodiment mapping between SPs and TX beam(s) can be pre-defined. UE then determines the SP(s) to be monitored corresponding to UE's best DL TX beam or N best DL TX beam using the SP and DL TX beam mapping information received from the BS in operation 770. In an embodiment, UE monitors one or more SPs which are mapped to at least UE's best DL TX beam. In another embodiment, UE monitors one or more SPs which are mapped to at least one of the UE's N best DL TX beams. UE then monitors the downlink control in determined SPs in operation 780. UE receives downlink control info in the determined SP(s) using the best DL RX beam. If UE has multiple (P) AAs or antenna panels for RX beamforming, then UE may receive the downlink control info using one or more (up to P) DL RX beams.

If downlink control corresponding to its UE ID is decoded in SP,

If downlink control corresponds to DL data then the UE decode data in data region according to downlink control info. DL RX beam used to receive the downlink control is used to receive data.

If downlink control corresponds to UL then UE transmit in data region according to downlink control info.

Figure 8:
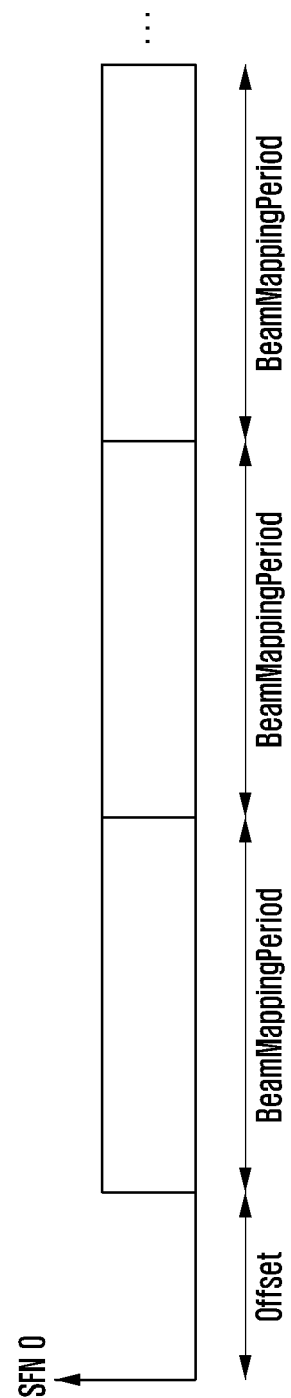
FIG. 8 is a diagram illustrating beam mapping periods according to an embodiment of the present disclosure.

FIG. 8 is a diagram illustrating beam mapping periods according to an embodiment of the present disclosure.

Referring to FIG. 8, following parameters can be signaled by the eNB:

Beam Mapping Period

Offset of first beam mapping period with respect to SFN 0

Mapping between beam IDs and SPs in Beam Mapping Period: This mapping is applied to each beam mapping period. Some SPs may not be mapped to any specific beam or may be mapped to all TX beams.

Figure 9:
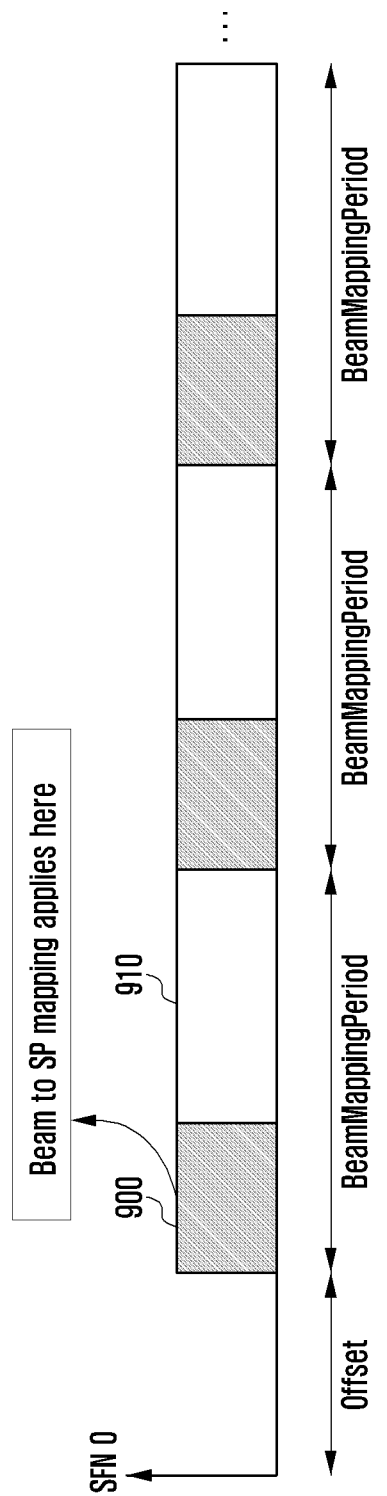
FIG. 9 is a diagram illustrating beam mapping periods according to an embodiment of the present disclosure.

FIG. 9 is a diagram illustrating beam mapping periods according to an embodiment of the present disclosure.

Referring to FIG. 9, following parameters can be signaled by the eNB:

Beam Mapping Period

Offset of first beam mapping period with respect to SFN 0

Mapping between beam IDs and SPs in Beam Mapping Period: This mapping is applied to part of each beam mapping period. Some SPs may not be mapped to any specific beam or may be mapped to all TX beams. The Mapping is defined for a portion (beam mapping duration) of beam mapping period. The part of each beam mapping period where beam to SP mapping applies is denoted by 900. Beam to SP mapping does not apply to the rest of beam mapping period 910.

In an embodiment, if SFN cycle is not multiple of beam mapping period then last beam mapping period is truncated at end of SFN cycle.

In an embodiment, the mapping of beam ID to SPs can be overridden for a specific beam mapping period by signaling (e.g., PDCCH) by eNB.

In an embodiment, beam mapping period can be radio frame which comprises of plurality of SPs. In this case eNB may signal only the Mapping between beam ID and SPs in radio frame and this is applied to each radio frame.

In an embodiment mapping between SPs and TX beam(s) can be pre-defined.

<One Downlink Control, N Data Region> Per SP

Figure 10:
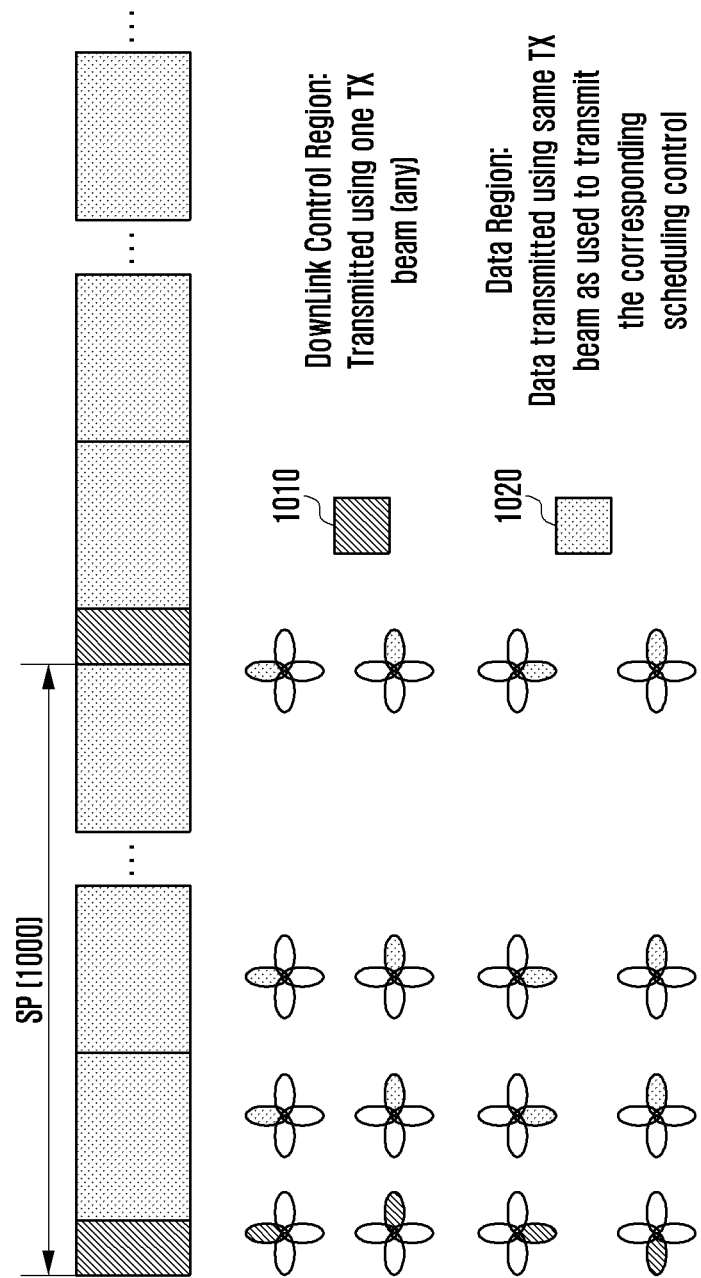
FIG. 10 is a diagram illustrating a method of performing scheduling in a SP wherein SP comprises of a downlink control region and multiple data regions according to an embodiment of the present disclosure.

FIG. 10 is a diagram illustrating a method of performing scheduling in a SP wherein SP comprises of a downlink control region and multiple data regions according to an embodiment of the present disclosure.

Downlink control is transmitted as illustrated in FIG. 10. Referring to FIG. 10, it is assumed that there are four DL TX beams at BS (or eNB or gNB or TRP). Each downlink period 1000 (multiple subframes or transmit timer intervals or time slots) comprise of a downlink control region 1010 and multiple data regions 1020. BS (or eNB or gNB or TRP) transmits downlink control information in downlink control region using one DL TX beam. Data in multiple data region are transmitted using same DL TX beam as used to transmit the corresponding downlink control. If the eNB has multiple AAs or antenna panels, it can transmit downlink control information using multiple DL TX beams in one SP. Also, data can be transmitted using multiple DL TX beams in one SP. The downlink control information or data transmitted in each TX beam can be for same UE or different UEs. Each DL TX beam can use all time and frequency resources of downlink control region or time and frequency resources of downlink control region can be partitioned per DL TX beam. In an embodiment, the downlink control region can be partitioned into one or more control resource set. The bandwidth of each control resource set can be smaller than carrier bandwidth. In case of multiple AAs or antenna panels in the BS (or eNB or gNB or TRP), each of these partition or control resource set can be mapped to one or more TX beams among multiple TX beams. In another embodiment, each of these partition or control resource set of the partitioned downlink control region can be allocated to different UEs. Instead of monitoring or receiving the downlink control information over entire carrier bandwidth, UE monitors one or more control resource sets assigned to it. The control resource sets can be assigned using dedicated signaling. This reduces the UEs power consumption. In an embodiment, UE monitors one control resource set during the off duration of DRX cycle and monitors all or additional control resource sets during the on duration of DRX cycle, if UE is configured with a DRX cycle. The control resource set(s) monitored by UE during the on duration and the control resource set(s) monitored by UE during the off duration can be signaled to UE in dedicated signaling.

Downlink control information transmitted in 'n'th SP can indicate DL data in 'nth' SP. In this case, if downlink control information indicates DL data in data region 'x' of SP then data in data region 'x' is transmitted by the BS using the same DL TX beam as used to transmit the downlink control information. In another embodiment, downlink control information transmitted in 'n'th SP can indicate DL data in 'n+K' SP. 'K' can be fixed or can be indicated in downlink control information. In this case, if downlink control information in SP 'n' indicates DL data in data region of another SP then data in data region can be transmitted by the BS (or eNB or gNB or TRP) using the same or different DL TX beam then used to transmit the downlink control information. Downlink control information transmitted in 'n'th SP can indicate UL data in in 'n+K' SP. 'K' can be fixed or can be indicated in downlink control information. In an embodiment 'K' can be based on UE capability. In an embodiment, downlink control information can also be transmitted in data region.

The TX beam used for DL transmission to UE is described as below. UE sends feedback to BS (or eNB or gNB or TRP) about the best DL TX beam or N best DL TX beams. DL TX beam refers to a TX beam of BS used for transmission in DL. Best DL TX beam is the TX beam of BS which can be received by UE with best signal quality amongst all the TX beams. If N is greater than one then all DL TX beams corresponds to same RX beam of UE. If UE has multiple (P) AAs or antenna panels for RX beamforming, N best DL TX beams reported may correspond to one or multiple (P) RX beams. DL RX beam refers to a RX beam of UE used for receiving the DL transmission. The DL RX beam with which the UE receives the DL transmission with best signal quality is the best DL RX beam. The feedback can be sent periodically by UE or as and when DL TX beam is changed.

Figure 11:
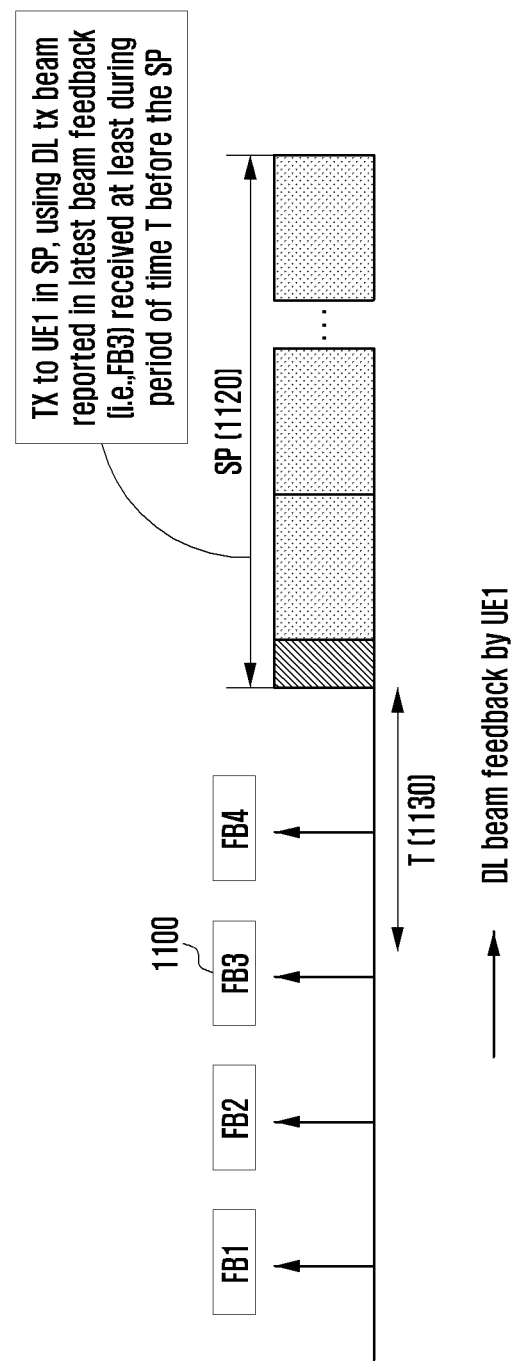
FIGS. 11 and 12 are diagrams illustrating beam feedback by UE according to various embodiments of the present disclosure.
Figure 12:
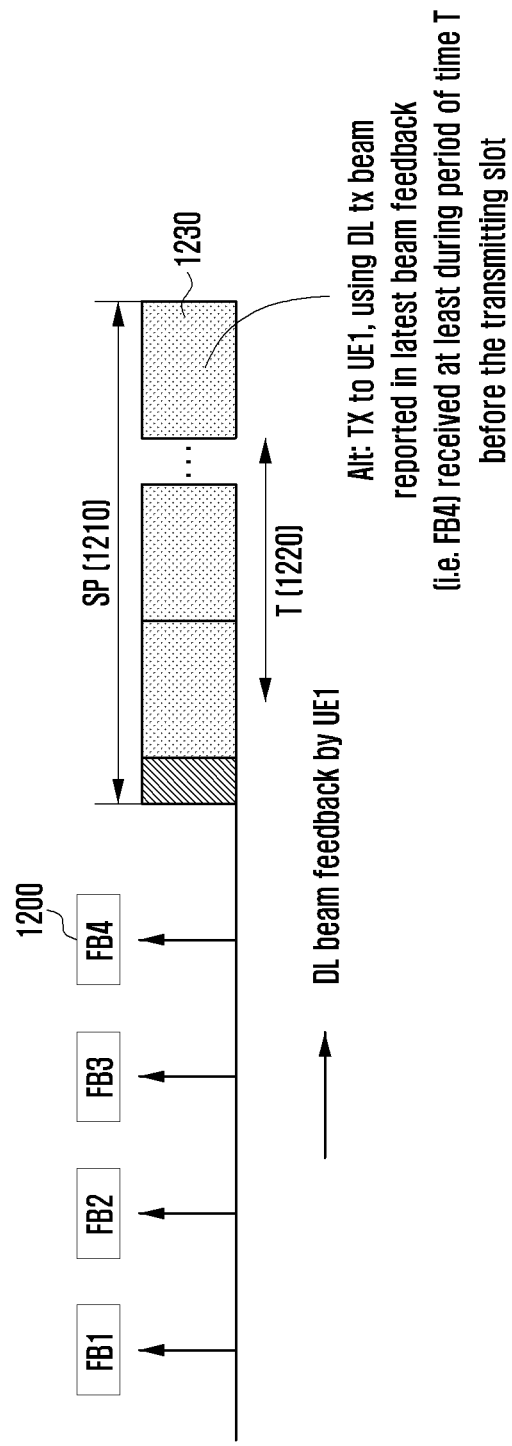

FIGS. 11 and 12 are diagrams illustrating beam feedback by UE according to various embodiments of present disclosure.

Referring to FIG. 11, BS transmits data to a UE in data region 'x' of SP 1120 using the DL TX beam reported in latest beam feedback (i.e., FB3 1100) received at least during period of time T 1130 before the start of SP. Time T can be fixed or signaled to UE in in dedicated or broadcast signaling.

Referring to FIG. 12, BS transmits data to a UE in data region 'x' of SP using the DL TX beam reported in latest beam feedback (i.e., FB4 1200) received at least during period of time T 1220 before the data region 'x' 1230 of SP 1210.

In an embodiment, a UE may use the best RX beam corresponding to DL TX beam reported in latest beam feedback transmitted at least time T before the SP. Alternately, if the beam feedback is configured such that time interval between beam feedback and SP is at least time T then UE may use the best RX beam corresponding to DL TX beam reported in latest beam feedback transmitted before the SP. Alternately, UE may use the best RX beam corresponding to DL TX beam reported in latest beam feedback transmitted before the SP.

In another embodiment, a UE may use the best RX beam corresponding to DL TX beam reported in latest beam feedback transmitted at least time T before the data region in which data are received. Alternately, if the beam feedback is configured such that time interval between beam feedback and data region is at least time T then UE may use the best RX beam corresponding to DL TX beam reported in latest beam feedback transmitted before the data region in which data are received. Alternately, UE may use the best RX beam corresponding to DL TX beam reported in latest beam feedback transmitted before the data region in which data are received.

UE Operation is described as below. A UE monitors downlink control in each SP using its best DL RX beam. If resources in downlink control region are partitioned per DL TX beam then it monitors resources corresponding to best DL TX beam. If downlink control corresponding to UE's ID is decoded in a SP then, if downlink control corresponds to DL data then UE decode data in data region according to downlink control info. RX beam used to receive the downlink control is used to receive data. Alternately, UE uses the DL best RX beam. If downlink control corresponds to UL then UE transmit in data region according to downlink control info.

Figure 13:
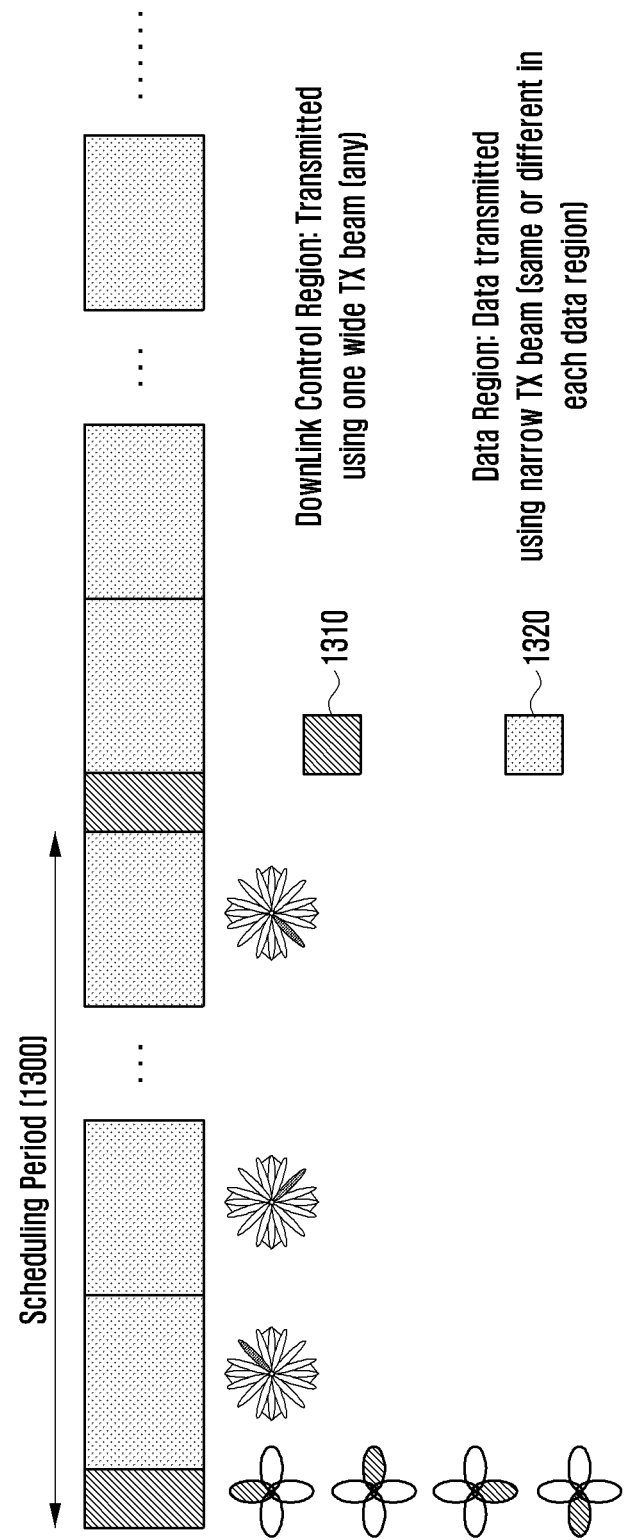
FIG. 13 is a diagram illustrating a method of performing scheduling by downlink control to data region according to an embodiment of the present disclosure.

FIG. 13 is a diagram illustrating a method of performing scheduling by downlink control to data region according to an embodiment of the present disclosure.

Referring to FIG. 13, downlink control is transmitted as illustrated. It is assumed that there are four wide DL TX beams at BS (or eNB or gNB or TRP). Each scheduling period 1300 (multiple subframes or transmit timer intervals or time slots) comprise of a downlink control region 1310 and multiple data regions 1320. BS (or eNB or gNB or TRP) transmits downlink control information in downlink control region using one wide DL TX beam. If the BS (or eNB or gNB or TRP) has multiple AAs or antenna panels, it can transmit downlink control information using multiple wide DL TX beams in one SP. Narrow beam is used to transmit data in data region. Narrow beam use to transmit data can be different in each data region of SP.

UE Operation is described as below. A UE monitors downlink control in each SP using the best DL RX beam corresponding to best DL wide TX beam. If UE has multiple (P) AAs or antenna panels for RX beamforming, then UE may receive downlink control using one or more (up to P) DL RX beams. If resources in downlink control region are partitioned per best DL wide TX beam then it monitors resources corresponding to best DL wide TX beam. If downlink control corresponding to UE's ID is decoded in a SP then, the UE decode data in data region according to downlink control info. Best DL RX beam corresponding to best narrow DL TX beam is used to receive data.

Figure 14:
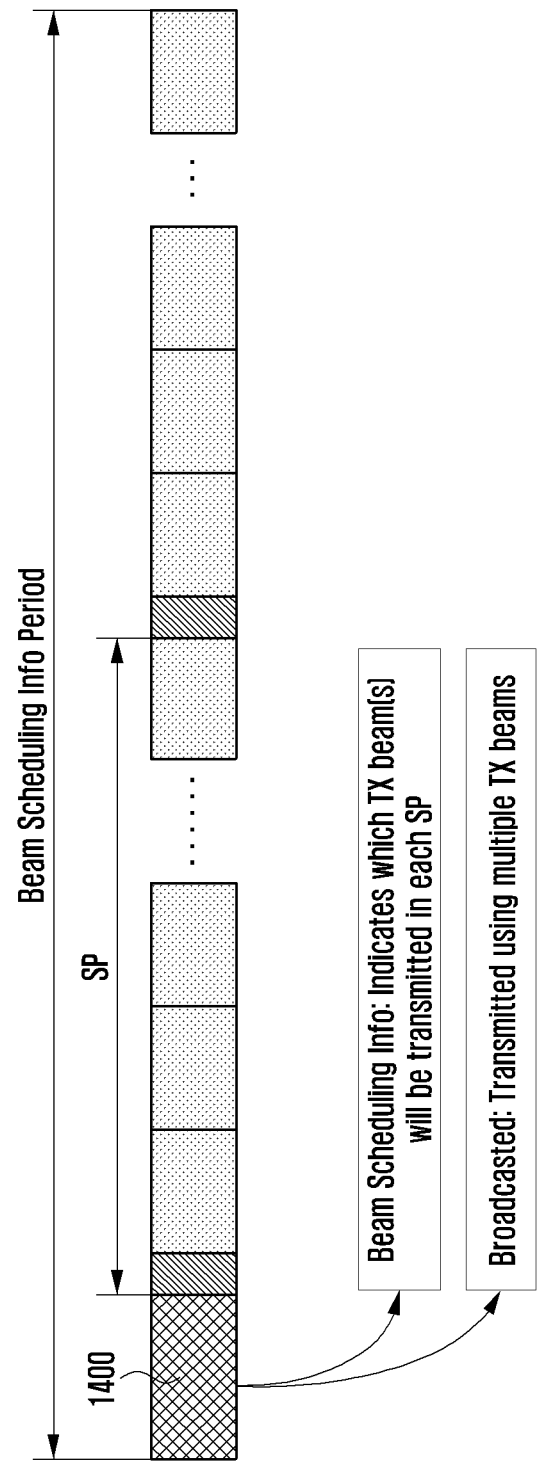
FIG. 14 is a diagram illustrating power saving method 1 applied to one downlink control and N data regions per SP according to an embodiment of the present disclosure.

FIG. 14 is a diagram illustrating power saving method 1 applied to one downlink control and N data regions per SP according to an embodiment of the present disclosure.

Power saving method 1 as illustrated and described in FIG. 3 can be applied in this case as well as shown in FIG. 14. Referring to FIG. 14, beam scheduling info 1400 can indicate which one or more DL TX beam will be transmitted in each SP. This information can be broadcasted by using multiple DL TX beams.

Figure 15:
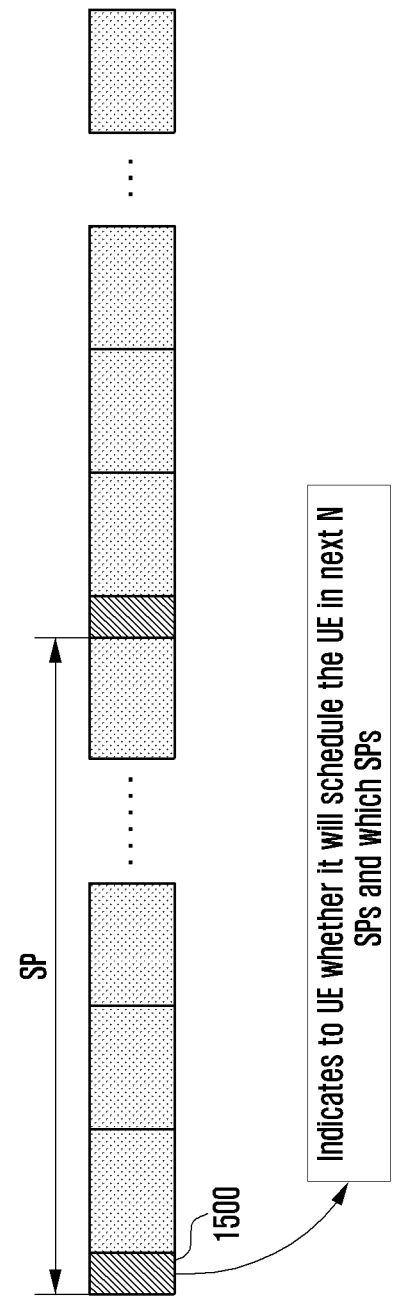
FIG. 15 is a diagram illustrating power saving method 2 applied to one downlink control and N data regions per SP according to an embodiment of the present disclosure.

FIG. 15 is a diagram illustrating power saving method 2 applied to one downlink control and N data regions per SP according to an embodiment of the present disclosure. Power saving method 2 as illustrated and described in FIGS. 5A and 5B can be applied in this case as well as shown in FIG. 15. Referring to FIG. 15, downlink control 1500 can indicates to UE whether it will schedule the UE in next N SPs and/or which SPs.

Power saving method 3 as illustrated and described in FIGS. 6A, 6B, 7A, 7B, 8, and 9 can be applied to in this case as well.

In an embodiment, the beam scheduling info may indicate (or contain) beam scheduling info period (in terms of time, or a number of sub-frames, or a number of radio frames, or any other UE aware time period) to dynamically allocate beam scheduling at each beam scheduling period.

<N Downlink Control, N Data Region> Per SP

Figure 16:
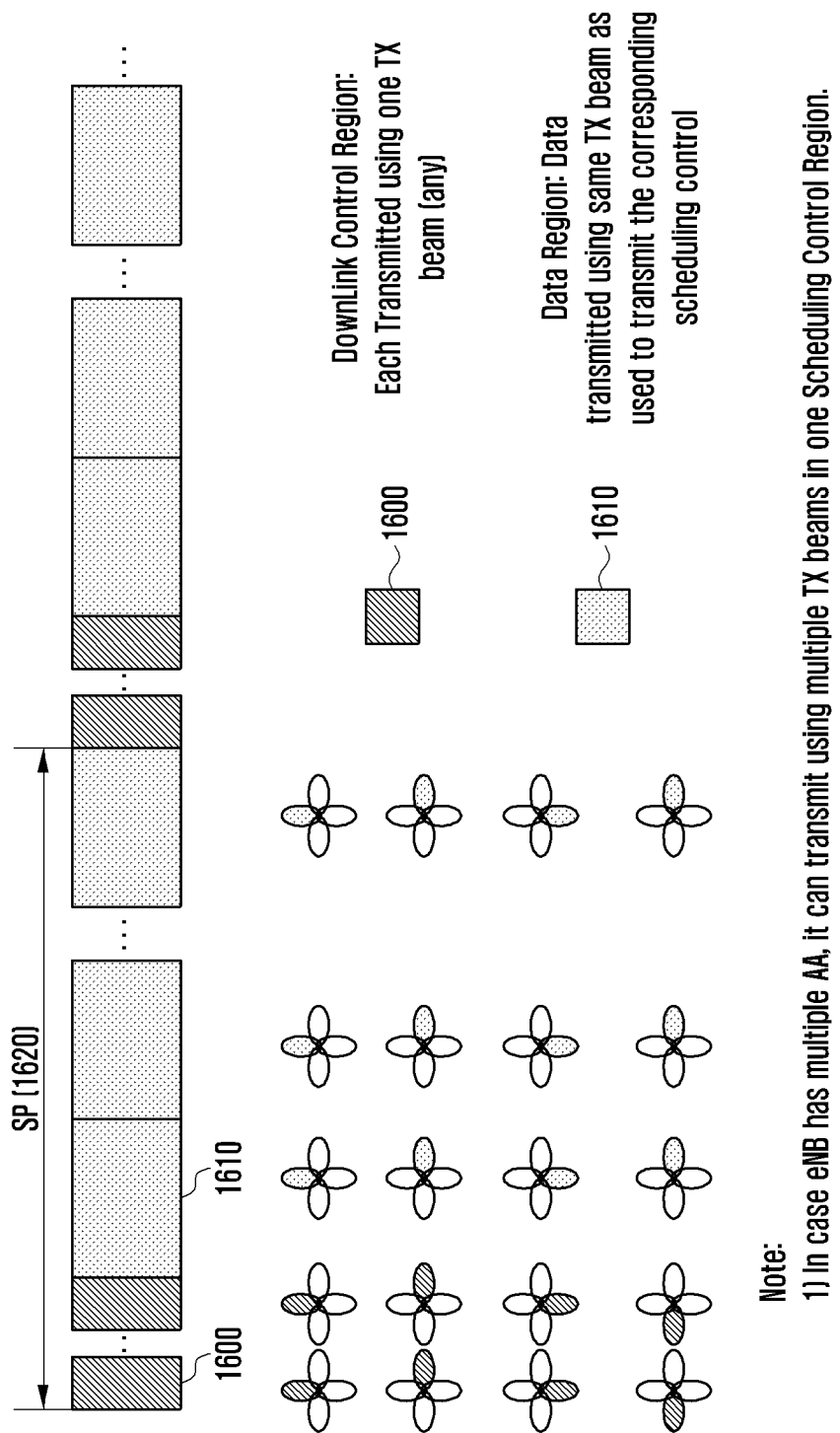
FIG. 16 is a diagram illustrating a method of performing scheduling in a SP wherein SP comprises of multiple scheduling control regions and multiple data regions according to an embodiment of the present disclosure.

FIG. 16 is a diagram illustrating a method of performing scheduling in a SP wherein SP comprises of multiple scheduling control regions and multiple data regions according to an embodiment of the present disclosure.

Referring to FIG. 16, downlink control is transmitted as illustrated in FIG. 16. It is assumed that there are four DL TX beams at BS. Each SP 1620 (multiple subframes or transmit timer intervals or time slots) comprise of multiple downlink control regions 1600 and multiple data regions 1610. BS transmits downlink control information in a downlink control region using one DL TX beam. If the eNB has multiple AAs or antenna panels, it can transmit downlink control information using multiple DL TX beams in one downlink control region. Data in multiple data region are transmitted using same DL TX beam as used to transmit the corresponding downlink control. In case the eNB has multiple AAs, it can transmit using multiple DL TX beams in one data region.

UE Operation is described as below. A UE monitors downlink control in each SP using the best DL RX beam. If UE has multiple (P) AAs or antenna panels for RX beamforming, then UE may receive downlink control using one or more (up to P) DL RX beams. If resources in downlink control region are partitioned per DL TX beam then it monitors resources corresponding to best DL TX beam. If downlink control corresponding to UE's ID is decoded in a SP then, if downlink control corresponds to DL data then UE decode data in data region according to downlink control info. DL RX beam used to receive the downlink control is used to receive data. Alternately, UE uses the best DL RX beam at the time of receiving data which may not be same as the DL RX beam used to receive the downlink control.

If downlink control corresponds to UL then UE transmit in data region according to downlink control info.

Figure 17:
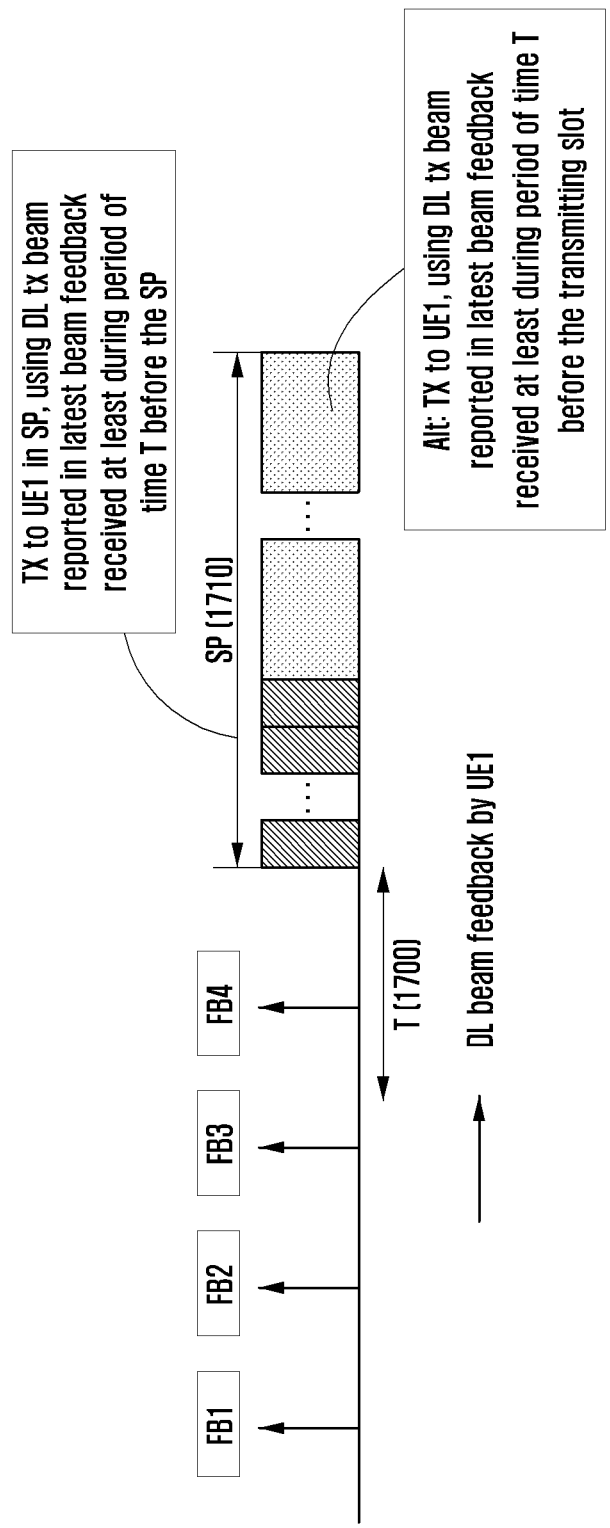
FIG. 17 is a diagram illustrating beam feedback by UE according to an embodiment of the present disclosure.

FIG. 17 is a diagram illustrating beam feedback by UE according to an embodiment of present disclosure.

Referring to FIG. 17, DL TX beam for data transmission to UE in data region by BS (or eNB or gNB or TRP) can selected based on beam feedback as illustrated in FIG. 17. In an embodiment, a BS (or eNB or gNB or TRP) can use DL TX beam reported in latest beam feedback received at least during period of time T 1700 before SP 1710 to transmit data to UE1 in SP 1710. In another embodiment, the BS (or eNB or gNB or TRP) can use DL TX beam reported in latest beam feedback received at least time before T before the transmitting slot for UE1. T' can be fixed or signaled to UE in in dedicated or broadcast signaling.

Figure 18:
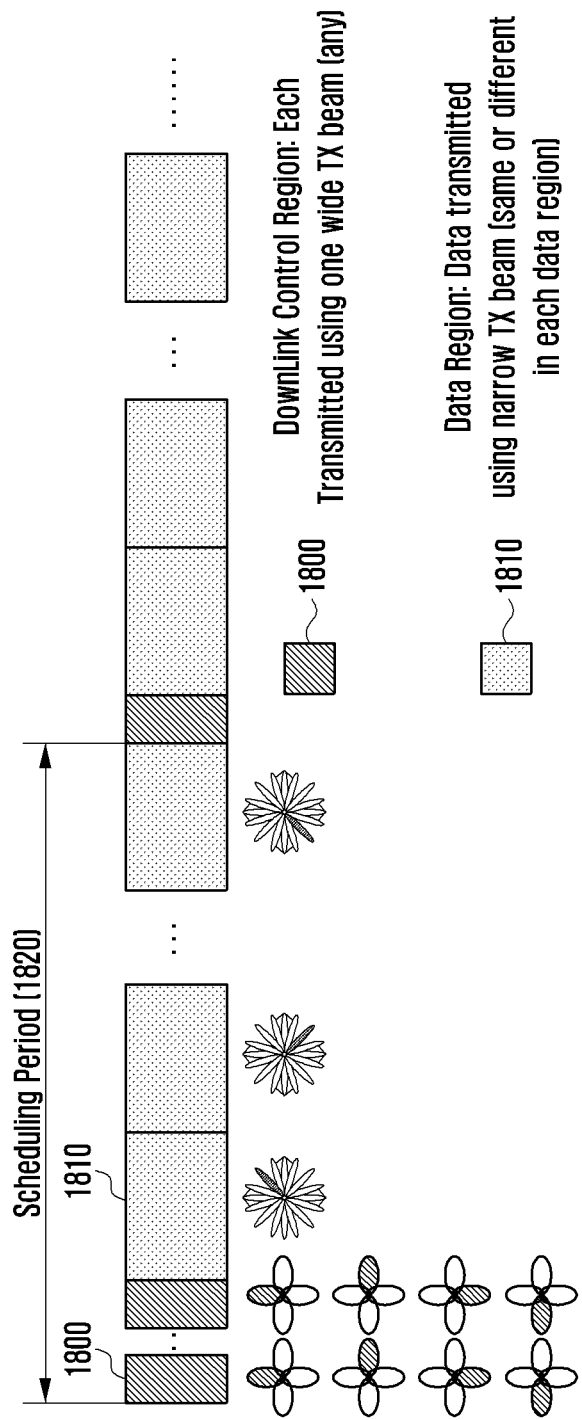
FIG. 18 is a diagram illustrating a method of performing scheduling by downlink control to data region according to an embodiment of the present disclosure.

FIG. 18 is a diagram illustrating a method of performing scheduling by downlink control to data region according to an embodiment of the present disclosure.

Referring to FIG. 18, downlink control is transmitted as illustrated. In FIG. 18, it is assumed that there are four wide DL TX beams at BS (or eNB or gNB or TRP). Each scheduling period 1820 (multiple subframes or transmit timer intervals or time slots) comprise of multiple downlink control regions 1800 and multiple data regions 1810. BS (or eNB or gNB or TRP) transmits downlink control information in downlink control region using one wide DL TX beam. Data in data region are transmitted using narrow DL TX beam. The narrow DL TX beam can be same or different in each data region. If the BS (or eNB or gNB or TRP) has multiple antenna arrays, it can transmit downlink control information using multiple wide DL TX beams in one downlink control region and data using multiple narrow DL TX beams in one data region. Each DL TX beam can use all time and frequency resources or time and frequency resources can be partitioned per DL TX beam. In an embodiment, the downlink control region can be partitioned into one or more control resource set. The bandwidth of each control resource set can be smaller than carrier bandwidth. In case of multiple AAs or antenna panels in the BS (or eNB or gNB or TRP), each of these partition or control resource set can be mapped to one or more TX beams among multiple TX beams. In another embodiment, each of these partition or control resource set of the partitioned downlink control region can be allocated to different UEs. Instead of monitoring or receiving the downlink control information over entire carrier bandwidth, UE monitors one or more control resource sets assigned to it. The control resource sets can be assigned using dedicated signaling. This reduces the UEs power consumption. In an embodiment, UE monitors one control resource set during the off duration of DRX cycle and monitors all or additional control resource sets during the on duration of DRX cycle, if UE is configured with a DRX cycle. The control resource set(s) monitored by UE during the on duration and the control resource set(s) monitored by UE during the off duration can be signaled to UE in dedicated signaling.

UE Operation is described as below. A UE monitors downlink control in each SP using the best DL RX beam corresponding to best wide DL TX beam. If resources in downlink control region are partitioned per wide DL TX beam then it monitors resources corresponding to best DL wide TX beam. If downlink control corresponding to its UE ID is decoded in a SP then, if downlink control corresponds to DL data then the UE decode data in data region according to downlink control info. RX beam used to receive the downlink control is used to receive data. Alternately, UE uses the best DL RX beam. Best DL RX beam at the time of receiving data which may not be same as the DL RX beam used to receive the downlink control. If downlink control corresponds to UL then UE transmit in data region according to downlink control info.

Power saving method 1, 2 and 3 as illustrated and described in FIGS. 3A, 3B, 5A, 5B, 6A, 6B, 7A, 7B, 8 and 9 can be applied to in this case as well.

<Implicit Indication of Beam ID of the Following Subframes>

In an embodiment, in any scheduled subframe, BS may indicate (in unicast manner or beam wise multicast) to UE N SPs where N SPs is the time gap after which it may schedule the UE or schedule using UE reported DL TX beam. During these N SPs UE does not need to monitor downlink control.

Figure 19:
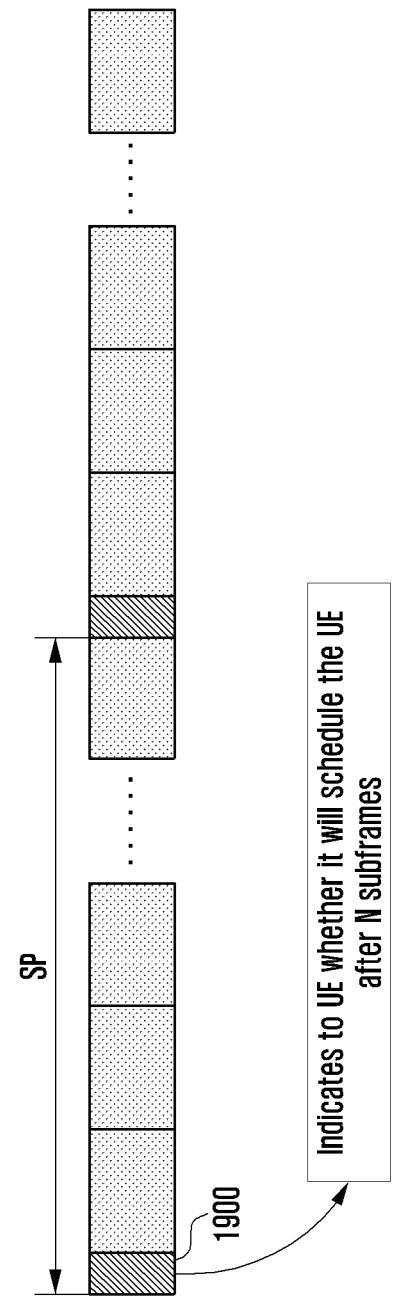
FIG. 19 is a diagram illustrating transmission of time gap information according to an embodiment of the present disclosure.

FIG. 19 is a diagram illustrating transmission of time gap information according to an embodiment of present disclosure. Referring to FIG. 19, time gap information 1900 can indicate to UE whether it will schedule the UE after N subframes.

In the beam-wise multicast transmission of the time gap, the transmission frame should target all the UEs within the same beam, and transmitted through a multicast frame (or broadcast frame, which is broadcasted by the specific beam only).

In the unicast transmission of the time gap, if the user's next scheduling is allocated, the eNB can set the time gap, N, to point the specific scheduling subframe, that the UE can awake and listen the subframe. Or, if the user's next scheduling is not allocated yet, the eNB can set the time gap, N, to point the next subframe with the same beam, Or, regardless of the user's scheduling allocation, the eNB can set the time gap, N, to point the next subframe with the same beam.

In an embodiment, the time gap, N, may have upper limit, or a termination point which point the last subframe of the scheduling period or the beam scheduling info period, as the following Equation 2:

$$N = \min(\text{\# of subframes eNB decides}, \text{\# of remaining subframes until this scheduling period ends}) \quad \text{Equation 2}$$

The UE which receives this information can go to sleep until the next N subframe passes, and wakes up at N+1 subframe to receive the scheduled resource.

The beam scheduling info may indicate (contain) the following beam scheduling info period (in terms of time, or a number of sub-frames, or a number of radio frames, or any other UE aware time period), to dynamically allocate beam scheduling at each beam scheduling period.

<Implicit Indication of Beam ID of the Following Subframes>

In the UE operation as described in FIG. 7B, UE needs to know mapping between DL TX beam and SPs (subframes, TTIs, or time slots). The eNB can implicitly indicate the beam IDs which following subframes/TTIs/slots will use, by ordering the beam measurement reference signals using the same order.

Figure 20:
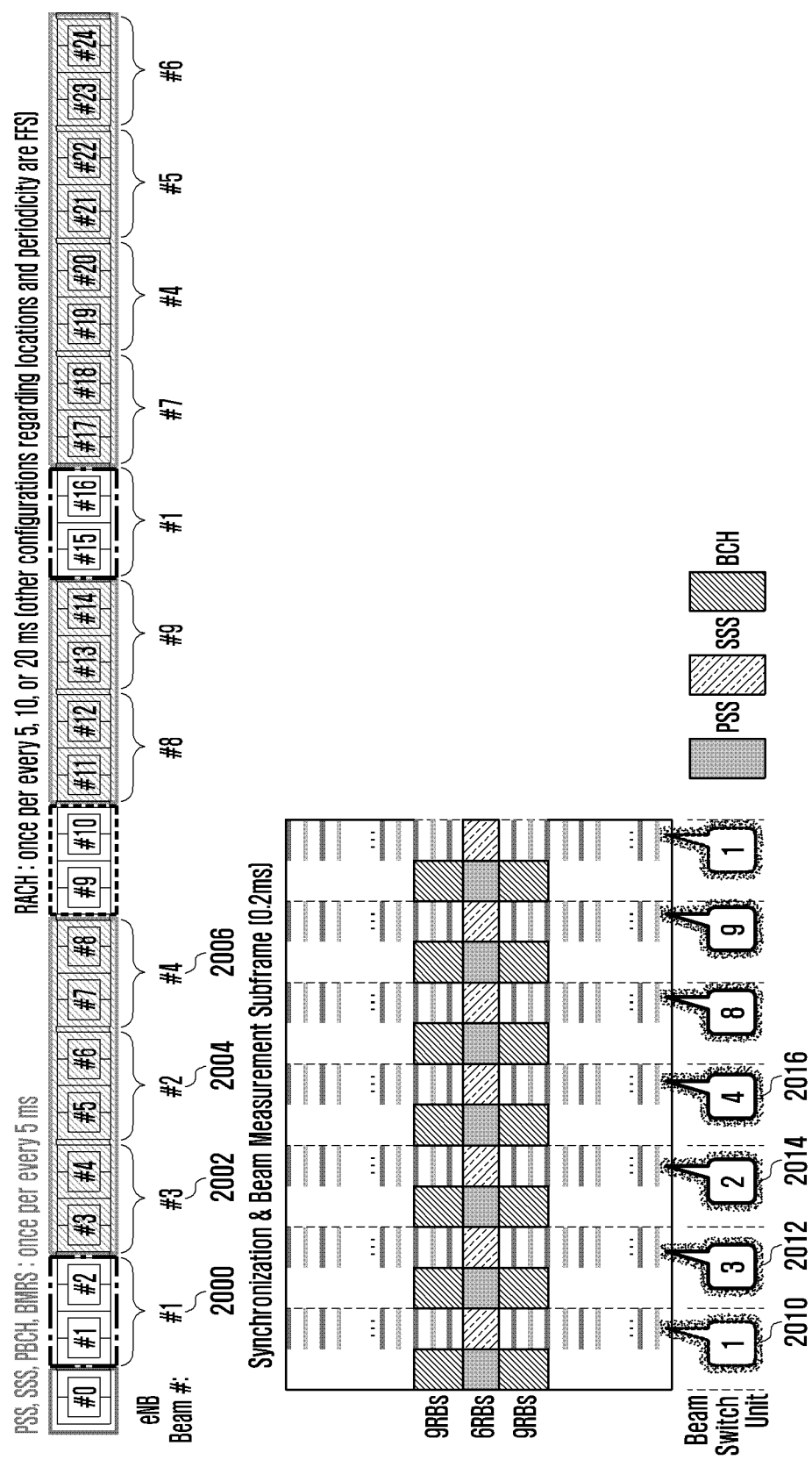
FIG. 20 is a diagram illustrating an embodiment of beam measurement reference signals and beam identifications (IDs) using the same order according to an embodiment of the present disclosure.

FIG. 20 is a diagram illustrating an embodiment of beam measurement reference signals and beam IDs using the same order according to an embodiment of the present disclosure.

Referring to FIG. 20, in a synchronization and beam measurement subframe, beam measurement reference signals using beam switch unit 1 (2010), beam switch unit 3 (2012), beam switch unit 2 (2014) and beam switch unit 4 (2016) are located from the front symbol of the subframe. The DL TX beams are mapped to multiple subframes using same order as beam measurement reference signals. (i.e., beam ID #1 (2000), beam ID #3 (2002), beam ID #2 (2004) and beam ID #4 (2006) are mapped to subframes in sequence).

Figure 21:
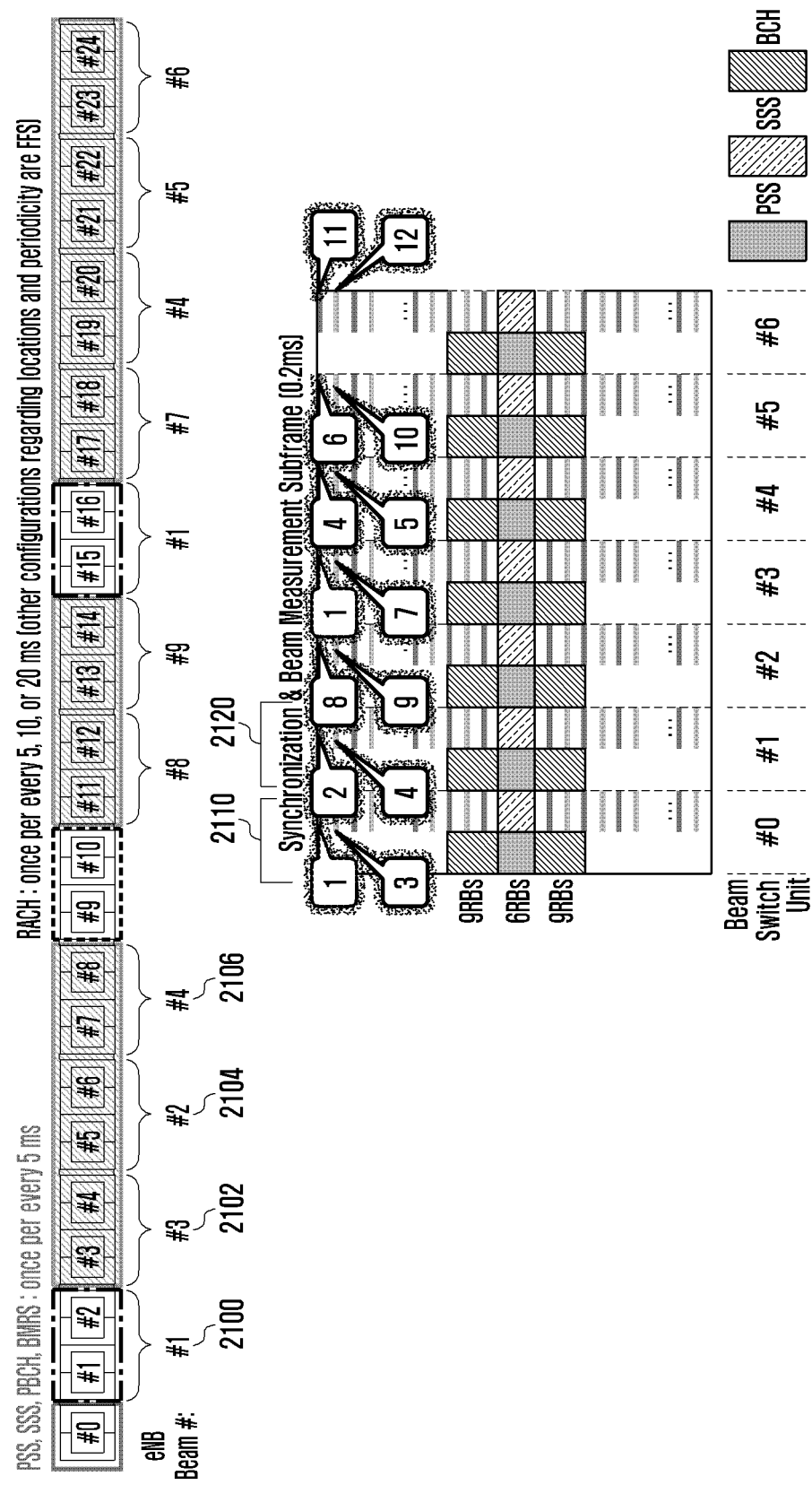
FIG. 21 is a diagram illustrating another embodiment of beam measurement reference signals and beam IDs using the same order according to an embodiment of the present disclosure.

FIG. 21 is a diagram illustrating another embodiment of beam measurement reference signals and beam IDs using the same order according to an embodiment of the present disclosure.

Referring to FIG. 21, in a synchronization and beam measurement subframe, beam measurement reference signals using beam switch unit 1 and 3 are located in a first symbol 2110 of the subframe and beam measurement reference signals using beam switch unit 2 and 4 are located in a second symbol 2120. The DL TX beams are mapped to multiple subframes using same order as beam measurement reference signals. (i.e., beam ID #1 (2100), beam ID #3 (2102), beam ID #2 (2104), and beam ID #4 (2106) are mapped to subframes in sequence).

If the beam measurement reference signal can be transmitted simultaneously using multiple frequency or/and antennas, those reference signal using beams can also be ordered with the same order following subframes will be use.

If there is any subframe which is not indicated with any beam ID due to the limit of reference signal transmission resource, all the UEs will try to listen those subframes not indicated.

In an embodiment of the present disclosure, proposed methods are also applicable for on duration during the DRX cycle if DRX is configured. Signaling for beam and subframe mapping can be configured as part of DRX parameters.

In the method explained in the present disclosure the beam ID to subframe mapping can be indicated in PBCH.

<SI Message Transmission Using Beamforming>

In the existing system SI message is transmitted in periodically occurring SI window. SI window consists of multiple time slots i.e., subframes/TTIs/slots. A UE monitors all the subframes in SI window to receive the SI message.

In case of beamforming SI messages needs to be transmitted using multiple beams in the SI window leading to increased size of SI window and increased wakeup time for UE. In order to reduce the UE wake up time, one or more subframes/TTIs/slots corresponding to each DL TX beam in SI window can be indicated. UE monitors only the subframes/TTIs/slots in SI window corresponding to best DL TX beam identified by it based on beam measurement (using primary synchronization signal (PSS)/secondary synchronization signal (SSS)/physical broadcast channel (PBCH) or beam reference signal (BRS)). Subframe/TTIs/slots to DL TX beam mapping can be indicated in PBCH or RRC signaling or SIB1. It can also be predefined. Subframe/TTIs/slots to DL TX beam mapping can be indicated using other methods as explained earlier in the present disclosure.

Figure 22:
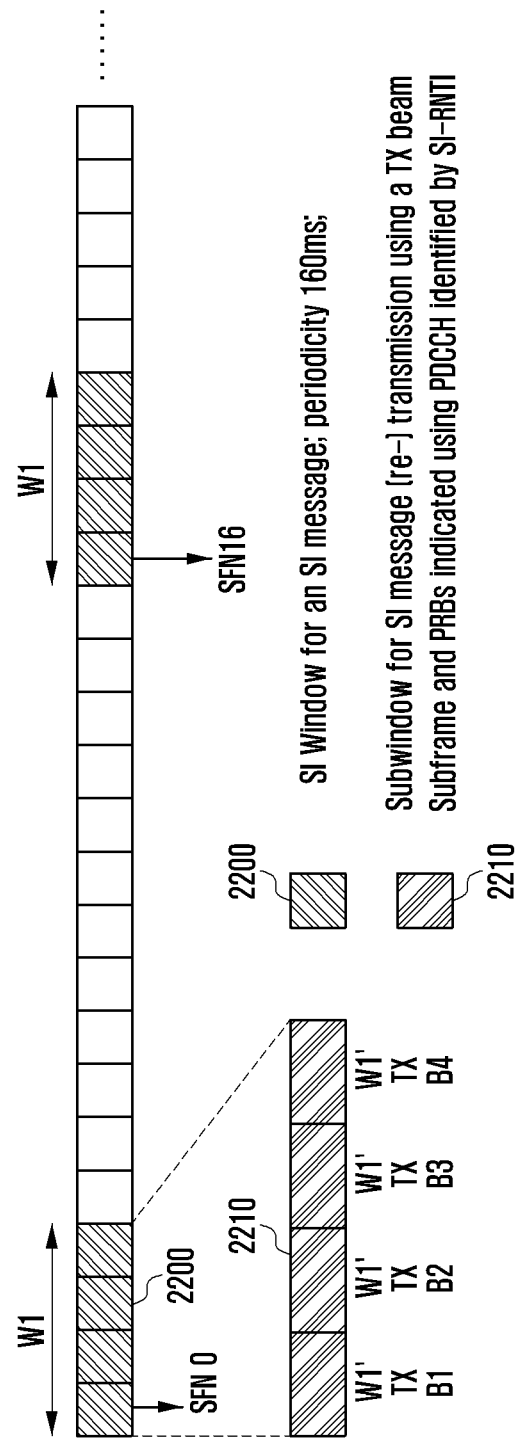
FIG. 22 is a diagram illustrating SI message transmission using beamforming according to an embodiment of the present disclosure.

FIG. 22 is a diagram illustrating SI message transmission using beamforming according to an embodiment of the present disclosure.

Referring to FIG. 22, SI message transmission with 160 ms periodicity using 4 DL TX beams is shown. SI window 2200 of length W1 consists of 4 sub-windows 2210. Each sub-window corresponds to a different DL TX beam. SI message is (re-)transmitted in a sub-window using DL TX beam. Sub-window may have a length W1' comprise of one or more subframes/TTIs/slots. In FIG. 22, each system frame (indicated using system frame number) comprises of 10 subframes.

In an alternate embodiment the subframe to DL TX beam may not be specified. Network can transmit or retransmit SI message using any DL TX beam in any subframe. UE should know which transmission or/and retransmission is corresponding to the best DL TX beam identified it so that it receives and combine the transmission or/and retransmission to receive the same SI message. Network can signal the DL TX beam ID in PDCCH corresponding to transmission or/and retransmission. Alternately, network can use different SI-RNTI for each DL TX beam ID.

Figure 23:
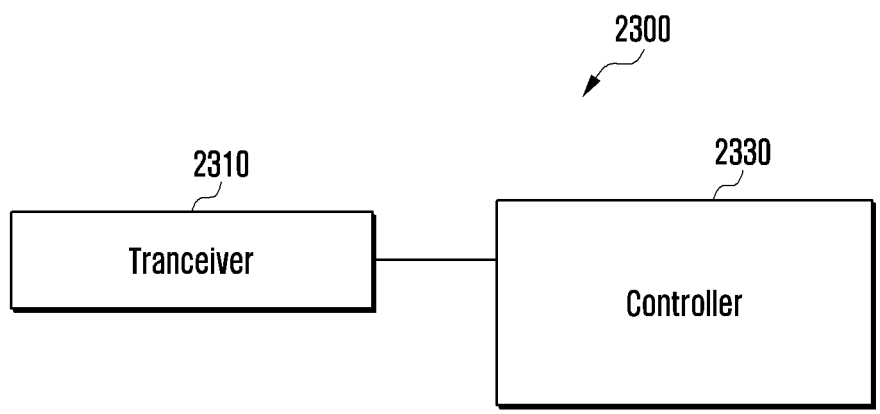
FIG. 23 is a block diagram illustrating a UE according to an embodiment of the present disclosure.

FIG. 23 is a block diagram illustrating a UE according to an embodiment of the present disclosure.

Referring to FIG. 23, a UE 2300 may be formed of a transceiver 2310 and a controller 2330. The UE 2300 can transmit and receive at least one of signals, information and messages through the transceiver 2310 with a BS. The controller 2330 is configured to control UE's operation according to an embodiment of the present disclosure. The controller 2330 can comprise at least one processor.

The controller 2330 can control to receive beam scheduling information for receiving downlink control information from a base station, determine at least one scheduling period to be monitored based on the beam scheduling information, and monitor the downlink control information in at least one scheduling period according to an embodiment of the present disclosure.

Figure 24:
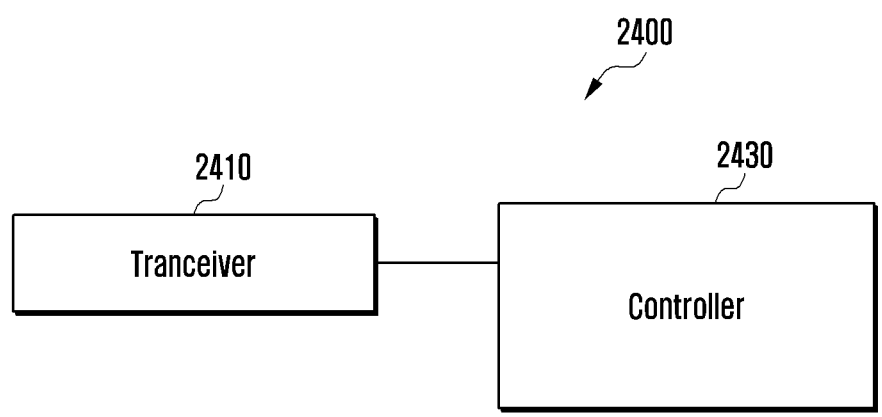
FIG. 24 is a block diagram illustrating a base station (BS) (or evolved NodeB (eNB) or gNB or (TRP)) according to an embodiment of the present disclosure.

FIG. 24 is a block diagram illustrating a BS (or eNB or gNB or TRP) according to an embodiment of the present disclosure.

Referring to FIG. 24, a BS 2400 may be formed of a transceiver 2410 and a controller 2430. The BS 2400 can transmit and receive at least one of signals, information and messages through the transceiver 2410 with a UE. The controller 2430 is configured to control UE's operation according to an embodiment of the present disclosure. The controller 2430 can comprise at least one processor. A transceiver configured to transmit and receive signals to and from a UE; and The controller 2430 can control to determine DL TX beam scheduling for receiving downlink control information to the UE, transmit beam scheduling information to the UE, and transmit the downlink control information according to the DL TX beam scheduling to the UE according to an embodiment of the present disclosure.

Those skilled in the art can appreciate that it is possible to implement the present disclosure in other particular forms without changing the technical idea or the essential features of the present disclosure. Accordingly, it should be understood that the embodiments described above are merely and are not limited. The scope of the present disclosure is defined by the appended claims to be described later, rather than the detailed description. Accordingly, it should be construed that all modifications or changes derived from the meaning and scope of the appended claims and their equivalents fall within the scope of the present disclosure.

In the above embodiments of the present disclosure, all operations and messages may be selectively performed or may be omitted. In addition, the operations in each embodiment do not need to be performed in sequence, and the order of the operations may vary. The messages do not also need to be delivered in sequence, and the order of delivery of the messages may vary. Each operation and each message transfer may be performed independently.

It will be apparent that it is also possible to employ the SCFE and the service capability server/application server (SCS/AS) from a point of view in which they are considered one entity. In this case, these two entities may be treated as one application server (e.g., group communication service application server).

All or some of the tables illustrated in the above embodiments are intended to help the understanding of the present disclosure by specifically showing embodiments of the present disclosure. Accordingly, the details of the tables may be considered the representation of a part of the method and apparatus proposed in the present disclosure. That is, it may be preferred that the details of the tables in the specification are approached semantically, rather than syntactically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station in a wireless communication system, the method comprising:
generating beam scheduling information for indicating a plurality of different downlink (DL) transmission (TX) beams for transmitting downlink control information to a user equipment (UE) in a beam scheduling information period, wherein the beam scheduling information period includes a plurality of subframes and the beam scheduling information includes indices of each DL TX beam identifying which DL TX beams are used to transmit the downlink control information in each of the plurality of subframes;
transmitting the beam scheduling information once in the beam scheduling information period;
transmitting the downlink control information using DL TX beams indicated by the indices of DL TX beams included in the beam scheduling information in a subframe; and
transmitting data in the subframe using the same DL TX beams used to transmit the downlink control information in the subframe,
wherein the beam scheduling information in a beam scheduling information period n indicates the plurality of DL TX beams in the beam scheduling information period n or a beam scheduling information period n+k, wherein k is predetermined,
wherein the downlink control information indicates a scheduling of DL data which is transmitted after K subframes from the subframe in which the downlink control information is transmitted, and
wherein a value of K is included in the downlink control information.

2. The method of claim 1, wherein the data in the each of the plurality of subframes is scheduled based on the downlink control information in the each of the plurality of subframes.

3. The method of claim 1, wherein the downlink control information is transmitted in one or more control resource sets in the subframe.

4. A method of a user equipment (UE) in a wireless communication system, the method comprising:
receiving beam scheduling information for indicating a plurality of different downlink (DL) transmission (TX) beams for receiving downlink control information from a base station once in a beam scheduling information period, wherein the beam scheduling information period includes a plurality of subframes and the beam scheduling information includes indices of each DL TX beam identifying which DL TX beams are used to receive the downlink control information in each of the plurality of subframes;
identifying the plurality of subframes to be monitored based on the beam scheduling information;
monitoring the downlink control information based on DL TX beams indicated by the indices of DL TX beams included in the beam scheduling information in a subframe; and
receiving data using the same DL TX beams used to receive downlink control information in the subframe,
wherein the beam scheduling information in a beam scheduling information period n indicates the plurality of DL TX beams in the beam scheduling information period n or a beam scheduling information period n+k, wherein k is predetermined,
wherein the downlink control information indicates a scheduling of DL data which is received after K subframes from the subframe in which the downlink control information is received, and
wherein a value of K is included in the downlink control information.

5. The method of claim 4,
wherein the data in the each of the plurality of subframes is scheduled based on the downlink control information in the each of the plurality of subframes, and
wherein the downlink control information is associated with an identifier of the UE.

6. The method of claim 4, wherein the downlink control information is monitored in one or more control resource sets in the subframe.

7. A base station in a wireless communication system, the base station comprising:
a transceiver configured to transmit and receive signals to and from a user equipment (UE); and
at least one processor configured to:
generate beam scheduling information for indicating a plurality of different downlink (DL) transmission (TX) beams for transmitting downlink control information to the UE in a beam scheduling information period, wherein the beam scheduling information period includes a plurality of subframes and the beam scheduling information includes indices of each DL TX beam identifying which DL TX beams are used to transmit the downlink control information in each of the plurality of subframes,
transmit the beam scheduling information once in the beam scheduling information period,
transmit the downlink control information using DL TX beams indicated by the indices of DL TX beams included in the beam scheduling information in a subframe, and
transmit data in the subframe using the same DL TX beams used to transmit the downlink control information in the subframe,
wherein the beam scheduling information in a beam scheduling information period n indicates the plurality of DL TX beams in the beam scheduling information period n or a beam scheduling information period n+k, wherein k is predetermined,
wherein the downlink control information indicates a scheduling of DL data which is transmitted after K subframes from the subframe in which the downlink control information is transmitted, and
wherein a value of K is included in the downlink control information.

8. The base station of claim 7, wherein the data in the each of the plurality of subframes is scheduled based on the downlink control information in the each of the plurality of subframes.

9. The base station of claim 7, wherein the downlink control information is transmitted in one or more control resource sets in the subframe.

10. A user equipment (UE) in a wireless communication system, the UE comprising:
- a transceiver configured to transmit and receive signals to and from a base station; and
- at least one processor configured to:
    - receive beam scheduling information for indicating a plurality of different downlink (DL) transmission (TX) beams for receiving downlink control information from a base station once in a beam scheduling information period, wherein the beam scheduling information period includes a plurality of subframes and the beam scheduling information includes indices of each DL TX beam identifying which DL TX beams are used to receive the downlink control information in each of the plurality of subframes,
    - identify the plurality of subframes to be monitored based on the beam scheduling information,
    - monitor the downlink control information based on DL TX beams indicated by the indices of DL TX beams included in the beam scheduling information in a subframe, and
    - receive data using the same DL TX beams used to receive downlink control information in the subframe, wherein the beam scheduling information in a beam scheduling information period n indicates the plurality of DL TX beams in the beam scheduling information period n or a beam scheduling information period n+k, and wherein k is predetermined, wherein the downlink control information indicates a scheduling of DL data which is received after K subframes from the subframe in which the downlink control information is received, and wherein a value of K is included in the downlink control information.

11. The UE of claim 10, wherein the data in the each of the plurality of subframes is scheduled based on the downlink control information in the each of the plurality of subframes, and wherein the downlink control information is associated with an identifier of the UE.

12. The UE of claim 10, wherein the downlink control information is monitored in one or more control resource sets in the subframe.

\* \* \* \* \*